(12) United States Patent
Shokrollahi

(10) Patent No.: US 10,020,966 B2
(45) Date of Patent: Jul. 10, 2018

(54) VECTOR SIGNALING CODES WITH HIGH PIN-EFFICIENCY FOR CHIP-TO-CHIP COMMUNICATION AND STORAGE

(71) Applicant: KANDOU LABS, S.A., Lausanne (CH)

(72) Inventor: Amin Shokrollahi, Preverenges (CH)

(73) Assignee: KANDOU LABS, S.A., Lausanne (CH)

( * ) Notice: Subject to any disclaimer, the term of this patent is extended or adjusted under 35 U.S.C. 154(b) by 0 days.

(21) Appl. No.: 15/390,293

(22) Filed: Dec. 23, 2016

(65) Prior Publication Data

US 2017/0111192 A1    Apr. 20, 2017

Related U.S. Application Data

(63) Continuation of application No. 15/176,085, filed on Jun. 7, 2016, now Pat. No. 9,686,106, which is a continuation of application No. 14/636,098, filed on Mar. 2, 2015, now Pat. No. 9,363,114.

(60) Provisional application No. 61/946,574, filed on Feb. 28, 2014.

(51) Int. Cl.
| | |
|---|---|
| *H04L 7/00* | (2006.01) |
| *H04L 25/49* | (2006.01) |
| *H04L 25/03* | (2006.01) |
| *H04L 25/08* | (2006.01) |

(52) U.S. Cl.
CPC ........ *H04L 25/49* (2013.01); *H04L 25/03006* (2013.01); *H04L 25/03057* (2013.01); *H04L 25/08* (2013.01); *H04L 25/085* (2013.01)

(58) Field of Classification Search
CPC ... H04L 25/49; H04L 25/03006; H04L 25/08; H04L 25/03057; H04L 25/085
See application file for complete search history.

(56) References Cited

U.S. PATENT DOCUMENTS

| | | |
|---|---|---|
| 668,687 A | 2/1901 | Mayer |
| 780,883 A | 1/1905 | Hinchman |
| 3,196,351 A | 7/1965 | Slepian |
| 3,636,463 A | 1/1972 | Ongkiehong |
| 3,939,468 A | 2/1976 | Mastin |

(Continued)

FOREIGN PATENT DOCUMENTS

| | | |
|---|---|---|
| CN | 1864346 | 11/2006 |
| CN | 101478286 | 7/2009 |

(Continued)

OTHER PUBLICATIONS

"Introduction to: Analog Computers and the DSPACE System," Course Material ECE 5230 Spring 2008, Utah State University, www.coursehero.com, 12 pages.

(Continued)

*Primary Examiner* — Dac Ha
(74) *Attorney, Agent, or Firm* — Invention Mine, LLC

(57) ABSTRACT

An alternative type of vector signaling codes having increased pin-efficiency normal vector signaling codes is described. Receivers for these Permutation Modulation codes of Type II use comparators requiring at most one fixed reference voltage. The resulting systems can allow for a better immunity to ISI-noise than those using conventional multilevel signaling such as PAM-X. These codes are also particularly advantageous for storage and recovery of information in memory, as in a DRAM.

20 Claims, 17 Drawing Sheets

(56) References Cited

U.S. PATENT DOCUMENTS

| | | |
|---|---|---|
| 4,163,258 A | 7/1979 | Ebihara |
| 4,181,967 A | 1/1980 | Nash |
| 4,206,316 A | 6/1980 | Burnsweig |
| 4,276,543 A | 6/1981 | Miller |
| 4,486,739 A | 12/1984 | Franaszek |
| 4,499,550 A | 2/1985 | Ray, III |
| 4,722,084 A | 1/1988 | Morton |
| 4,772,845 A | 9/1988 | Scott |
| 4,774,498 A | 9/1988 | Traa |
| 4,864,303 A | 9/1989 | Ofek |
| 4,897,657 A | 1/1990 | Brubaker |
| 4,974,211 A | 11/1990 | Corl |
| 5,017,924 A | 5/1991 | Guiberteau |
| 5,053,974 A | 10/1991 | Penz |
| 5,166,956 A | 11/1992 | Baltus |
| 5,168,509 A | 12/1992 | Nakamura |
| 5,266,907 A | 11/1993 | Dacus |
| 5,283,761 A | 2/1994 | Gillingham |
| 5,287,305 A | 2/1994 | Yoshida |
| 5,311,516 A | 5/1994 | Kuznicki |
| 5,331,320 A | 7/1994 | Cideciyan |
| 5,412,689 A | 5/1995 | Chan |
| 5,449,895 A | 9/1995 | Hecht |
| 5,459,465 A | 10/1995 | Kagey |
| 5,461,379 A | 10/1995 | Weinman |
| 5,510,736 A | 4/1996 | Van De Plassche |
| 5,511,119 A | 4/1996 | Lechleider |
| 5,553,097 A | 9/1996 | Dagher |
| 5,566,193 A | 10/1996 | Cloonan |
| 5,599,550 A | 2/1997 | Kohlruss |
| 5,626,651 A | 5/1997 | Dullien |
| 5,629,651 A | 5/1997 | Mizuno |
| 5,659,353 A | 8/1997 | Kostreski |
| 5,727,006 A | 3/1998 | Dreyer |
| 5,748,948 A | 5/1998 | Yu |
| 5,802,356 A | 9/1998 | Gaskins |
| 5,825,808 A | 10/1998 | Hershey |
| 5,856,935 A | 1/1999 | Moy |
| 5,875,202 A | 2/1999 | Venters |
| 5,945,935 A | 8/1999 | Kusumoto |
| 5,949,060 A | 9/1999 | Schattschneider |
| 5,982,954 A | 11/1999 | Delen |
| 5,995,016 A | 11/1999 | Perino |
| 5,999,016 A | 12/1999 | McClintock |
| 6,005,895 A | 12/1999 | Perino |
| 6,084,883 A | 7/2000 | Norrell |
| 6,119,263 A | 9/2000 | Mowbray |
| 6,172,634 B1 | 1/2001 | Leonowich |
| 6,175,230 B1 | 1/2001 | Hamblin |
| 6,232,908 B1 | 5/2001 | Nakaigawa |
| 6,278,740 B1 | 8/2001 | Nordyke |
| 6,316,987 B1 | 11/2001 | Dally |
| 6,346,907 B1 | 2/2002 | Dacy |
| 6,359,931 B1 | 3/2002 | Perino |
| 6,378,073 B1 | 4/2002 | Davis |
| 6,384,758 B1 | 5/2002 | Michalski |
| 6,398,359 B1 | 6/2002 | Silverbrook |
| 6,404,820 B1 | 6/2002 | Postol |
| 6,417,737 B1 | 7/2002 | Moloudi |
| 6,433,800 B1 | 8/2002 | Holtz |
| 6,452,420 B1 | 9/2002 | Wong |
| 6,473,877 B1 | 10/2002 | Sharma |
| 6,483,828 B1 | 11/2002 | Balachandran |
| 6,504,875 B2 | 1/2003 | Perino |
| 6,509,773 B2 | 1/2003 | Buchwald |
| 6,522,699 B1 | 2/2003 | Anderson |
| 6,556,628 B1 | 4/2003 | Poulton |
| 6,563,382 B1 | 5/2003 | Yang |
| 6,621,427 B2 | 9/2003 | Greenstreet |
| 6,624,699 B2 | 9/2003 | Yin |
| 6,650,638 B1 | 11/2003 | Walker |
| 6,661,355 B2 | 12/2003 | Cornelius |
| 6,664,355 B2 | 12/2003 | Kim |
| 6,686,879 B2 | 2/2004 | Shattil |
| 6,690,739 B1 | 2/2004 | Mui |
| 6,766,342 B2 | 7/2004 | Kechriotis |
| 6,772,351 B1 | 8/2004 | Werner |
| 6,839,429 B1 | 1/2005 | Gaikwad |
| 6,839,587 B2 | 1/2005 | Yonce |
| 6,854,030 B2 | 2/2005 | Perino |
| 6,865,234 B1 | 3/2005 | Agazzi |
| 6,865,236 B1 | 3/2005 | Terry |
| 6,876,317 B2 | 4/2005 | Sankaran |
| 6,898,724 B2 | 5/2005 | Chang |
| 6,927,709 B2 | 8/2005 | Kiehl |
| 6,954,492 B1 | 10/2005 | Williams |
| 6,963,622 B2 | 11/2005 | Eroz |
| 6,972,701 B2 | 12/2005 | Jansson |
| 6,973,613 B2 | 12/2005 | Cypher |
| 6,976,194 B2 | 12/2005 | Cypher |
| 6,982,954 B2 | 1/2006 | Dhong |
| 6,990,138 B2 | 1/2006 | Bejjani |
| 6,991,038 B2 | 1/2006 | Guesnon |
| 6,993,311 B2 | 1/2006 | Li |
| 6,999,516 B1 | 2/2006 | Rajan |
| 7,023,817 B2 | 4/2006 | Kuffner |
| 7,039,136 B2 | 5/2006 | Olson |
| 7,053,802 B2 | 5/2006 | Cornelius |
| 7,075,996 B2 | 7/2006 | Simon |
| 7,080,288 B2 | 7/2006 | Ferraiolo |
| 7,082,557 B2 | 7/2006 | Schauer |
| 7,085,153 B2 | 8/2006 | Ferrant |
| 7,085,336 B2 | 8/2006 | Lee |
| 7,127,003 B2 | 10/2006 | Rajan |
| 7,130,944 B2 | 10/2006 | Perino |
| 7,142,612 B2 | 11/2006 | Horowitz |
| 7,142,865 B2 | 11/2006 | Tsai |
| 7,164,631 B2 | 1/2007 | Tateishi |
| 7,167,019 B2 | 1/2007 | Broyde |
| 7,176,823 B2 | 2/2007 | Zabroda |
| 7,180,949 B2 | 2/2007 | Kleveland |
| 7,184,483 B2 | 2/2007 | Rajan |
| 7,199,728 B2 | 4/2007 | Dally |
| 7,231,558 B2 | 6/2007 | Gentieu |
| 7,269,130 B2 | 9/2007 | Pitio |
| 7,269,212 B1 | 9/2007 | Chau |
| 7,335,976 B2 | 2/2008 | Chen |
| 7,336,112 B1 | 2/2008 | Sha |
| 7,339,990 B2 | 3/2008 | Hidaka |
| 7,346,819 B2 | 3/2008 | Bansal |
| 7,348,989 B2 | 3/2008 | Stevens |
| 7,349,484 B2 | 3/2008 | Stojanovic |
| 7,356,213 B1 | 4/2008 | Cunningham |
| 7,358,869 B1 | 4/2008 | Chiarulli |
| 7,362,130 B2 | 4/2008 | Broyde |
| 7,362,697 B2 | 4/2008 | Becker |
| 7,366,942 B2 | 4/2008 | Lee |
| 7,370,264 B2 | 5/2008 | Worley |
| 7,372,390 B2 | 5/2008 | Yamada |
| 7,389,333 B2 | 6/2008 | Moore |
| 7,397,302 B2 | 7/2008 | Bardsley |
| 7,400,276 B1 | 7/2008 | Sotiriadis |
| 7,428,273 B2 | 9/2008 | Foster |
| 7,456,778 B2 | 11/2008 | Werner |
| 7,462,956 B2 | 12/2008 | Lan |
| 7,496,162 B2 | 2/2009 | Srebranig |
| 7,570,704 B2 | 4/2009 | Nagarajan |
| 7,535,957 B2 | 5/2009 | Ozawa |
| 7,539,532 B2 | 5/2009 | Tran |
| 7,599,390 B2 | 10/2009 | Pamarti |
| 7,613,234 B2 | 11/2009 | Raghavan |
| 7,616,075 B2 | 11/2009 | Kushiyama |
| 7,620,116 B2 | 11/2009 | Bessios |
| 7,633,850 B2 | 12/2009 | Nagarajan |
| 7,639,596 B2 | 12/2009 | Cioffi |
| 7,643,588 B2 | 1/2010 | Visalli |
| 7,650,525 B1 | 1/2010 | Chang |
| 7,656,321 B2 | 2/2010 | Wang |
| 7,694,204 B2 | 4/2010 | Schmidt |
| 7,697,915 B2 | 4/2010 | Behzad |
| 7,698,088 B2 | 4/2010 | Sul |
| 7,706,456 B2 | 4/2010 | Laroia |
| 7,706,524 B2 | 4/2010 | Zerbe |
| 7,746,764 B2 | 6/2010 | Rawlins |

(56) References Cited

U.S. PATENT DOCUMENTS

| | | |
|---|---|---|
| 7,768,312 B2 | 8/2010 | Hirose |
| 7,787,572 B2 | 8/2010 | Scharf |
| 7,804,361 B2 | 9/2010 | Lim |
| 7,808,456 B2 | 10/2010 | Chen |
| 7,808,883 B2 | 10/2010 | Green |
| 7,841,909 B2 | 11/2010 | Murray |
| 7,869,497 B2 | 1/2011 | Benvenuto |
| 7,869,546 B2 | 1/2011 | Tsai |
| 7,882,413 B2 | 2/2011 | Chen |
| 7,899,653 B2 | 3/2011 | Hollis |
| 7,907,676 B2 | 3/2011 | Stojanovic |
| 7,933,770 B2 | 4/2011 | Kruger |
| 8,000,664 B2 | 8/2011 | Khorram |
| 8,030,999 B2 | 10/2011 | Chatterjee |
| 8,036,300 B2 | 10/2011 | Evans |
| 8,050,332 B2 | 11/2011 | Chung |
| 8,055,095 B2 | 11/2011 | Palotai |
| 8,064,535 B2 | 11/2011 | Wiley |
| 8,085,172 B2 | 12/2011 | Li |
| 8,091,006 B2 | 1/2012 | Prasad |
| 8,106,806 B2 | 1/2012 | Toyomura |
| 8,149,906 B2 | 4/2012 | Saito |
| 8,159,375 B2 | 4/2012 | Abbasfar |
| 8,159,376 B2 | 4/2012 | Abbasfar |
| 8,180,931 B2 | 5/2012 | Lee |
| 8,185,807 B2 | 5/2012 | Oh |
| 8,199,849 B2 | 6/2012 | Oh |
| 8,199,863 B2 | 6/2012 | Chen |
| 8,218,670 B2 | 7/2012 | AbouRjeily |
| 8,233,544 B2 | 7/2012 | Bao |
| 8,245,094 B2 | 8/2012 | Jiang |
| 8,253,454 B2 | 8/2012 | Lin |
| 8,279,094 B2 | 10/2012 | Abbasfar |
| 8,289,914 B2 | 10/2012 | Li |
| 8,295,250 B2 | 10/2012 | Gorokhov |
| 8,295,336 B2 | 10/2012 | Lutz |
| 8,305,247 B2 | 11/2012 | Pun |
| 8,310,389 B1 | 11/2012 | Chui |
| 8,341,492 B2 | 12/2012 | Shen |
| 8,359,445 B2 | 1/2013 | Ware |
| 8,365,035 B2 | 1/2013 | Hara |
| 8,406,315 B2 | 3/2013 | Tsai |
| 8,406,316 B2 | 3/2013 | Sugita |
| 8,429,492 B2 | 4/2013 | Yoon |
| 8,429,495 B2 | 4/2013 | Przybylski |
| 8,437,440 B1 | 5/2013 | Zhang |
| 8,442,099 B1 | 5/2013 | Sederat |
| 8,442,210 B2 | 5/2013 | Zerbe |
| 8,443,223 B2 | 5/2013 | Abbasfar |
| 8,451,913 B2 | 5/2013 | Oh |
| 8,462,891 B2 | 6/2013 | Kizer |
| 8,472,513 B2 | 6/2013 | Malipatil |
| 8,620,166 B2 | 6/2013 | Dong |
| 8,498,344 B2 | 7/2013 | Wilson |
| 8,498,368 B1 | 7/2013 | Husted |
| 8,520,348 B2 | 8/2013 | Dong |
| 8,520,493 B2 | 8/2013 | Goulahsen |
| 8,539,318 B2 | 9/2013 | Cronie |
| 8,547,272 B2 | 10/2013 | Nestler |
| 8,577,284 B2 | 11/2013 | Seo |
| 8,578,246 B2 | 11/2013 | Mittelholzer |
| 8,588,254 B2 | 11/2013 | Diab |
| 8,588,280 B2 | 11/2013 | Oh |
| 8,593,305 B1 | 11/2013 | Tajalli |
| 8,602,643 B2 | 12/2013 | Gardiner |
| 8,604,879 B2 | 12/2013 | Mourant |
| 8,638,241 B2 | 1/2014 | Sudhakaran |
| 8,643,437 B2 | 2/2014 | Chiu |
| 8,649,445 B2 | 2/2014 | Cronie |
| 8,649,460 B2 | 2/2014 | Ware |
| 8,649,556 B2 | 2/2014 | Wedge |
| 8,649,840 B2 | 2/2014 | Sheppard, Jr. |
| 8,674,861 B2 | 3/2014 | Matsuno |
| 8,687,968 B2 | 4/2014 | Nosaka |
| 8,711,919 B2 | 4/2014 | Kumar |
| 8,718,184 B1 | 5/2014 | Cronie |
| 8,755,426 B1 | 6/2014 | Cronie |
| 8,773,964 B2 | 7/2014 | Hsueh |
| 8,780,687 B2 | 7/2014 | Clausen |
| 8,782,578 B2 | 7/2014 | Tell |
| 8,791,735 B1 | 7/2014 | Shibasaki |
| 8,831,440 B2 | 9/2014 | Yu |
| 8,841,936 B2 | 9/2014 | Nakamura |
| 8,879,660 B1 | 11/2014 | Peng |
| 8,897,134 B2 | 11/2014 | Kern |
| 8,898,504 B2 | 11/2014 | Baumgartner |
| 8,938,171 B2 | 1/2015 | Tang |
| 8,949,693 B2 | 2/2015 | Ordentlich |
| 8,951,072 B2 | 2/2015 | Hashim |
| 8,975,948 B2 | 3/2015 | GonzalezDiaz |
| 8,989,317 B1 | 3/2015 | Holden |
| 9,015,566 B2 | 4/2015 | Cronie |
| 9,020,049 B2 | 4/2015 | Schwager |
| 9,036,764 B1 | 5/2015 | Hossain |
| 9,059,816 B1 | 6/2015 | Simpson |
| 9,069,995 B1 | 6/2015 | Cronie |
| 9,077,386 B1 | 7/2015 | Holden |
| 9,083,576 B1 | 7/2015 | Hormati |
| 9,093,791 B2 | 7/2015 | Liang |
| 9,100,232 B1 | 8/2015 | Hormati |
| 9,106,465 B2 | 8/2015 | Walter |
| 9,124,557 B2 | 9/2015 | Fox |
| 9,148,087 B1 | 9/2015 | Tajalli |
| 9,152,495 B2 | 10/2015 | Losh |
| 9,165,615 B2 | 10/2015 | Amirkhany |
| 9,172,412 B2 | 10/2015 | Kim |
| 9,178,503 B2 | 11/2015 | Hsieh |
| 9,183,085 B1 | 11/2015 | Northcott |
| 9,197,470 B2 | 11/2015 | Okunev |
| 9,281,785 B2 | 3/2016 | Sjoland |
| 9,288,082 B1 | 3/2016 | Ulrich |
| 9,288,089 B2 | 3/2016 | Cronie |
| 9,292,716 B2 | 3/2016 | Winoto |
| 9,300,503 B1 | 3/2016 | Holden |
| 9,306,621 B2 | 4/2016 | Zhang |
| 9,331,962 B2 | 5/2016 | Lida |
| 9,362,974 B2 | 6/2016 | Fox |
| 9,363,114 B2 | 6/2016 | Shokrollahi |
| 9,374,250 B1 | 6/2016 | Musah |
| 9,401,828 B2 | 7/2016 | Cronie |
| 9,432,082 B2 | 8/2016 | Ulrich |
| 9,432,298 B1 | 8/2016 | Smith |
| 9,444,654 B2 | 9/2016 | Hormati |
| 9,455,744 B2 | 9/2016 | George |
| 9,455,765 B2 | 9/2016 | Schumacher |
| 9,461,862 B2 | 10/2016 | Holden |
| 9,479,369 B1 | 10/2016 | Shokrollahi |
| 9,509,437 B2 | 11/2016 | Shokrollahi |
| 9,520,883 B2 | 12/2016 | Shibasaki |
| 9,544,015 B2 | 1/2017 | Ulrich |
| 9,634,797 B2 | 4/2017 | Benammar |
| 9,667,379 B2 | 5/2017 | Cronie |
| 9,917,711 B2 | 3/2018 | Ulrich |
| 2002/0044316 A1 | 4/2002 | Myers |
| 2002/0057592 A1 | 5/2002 | Robb |
| 2002/0154633 A1 | 10/2002 | Shin |
| 2002/0167339 A1 | 11/2002 | Chang |
| 2002/0174373 A1 | 11/2002 | Chang |
| 2002/0181607 A1 | 12/2002 | Izumi |
| 2003/0016763 A1 | 1/2003 | Doi |
| 2003/0016770 A1 | 1/2003 | Trans |
| 2003/0046618 A1 | 3/2003 | Collins |
| 2003/0085763 A1 | 5/2003 | Schrodinger |
| 2003/0146783 A1 | 8/2003 | Bandy |
| 2003/0174023 A1 | 9/2003 | Miyasita |
| 2003/0185310 A1 | 10/2003 | Ketchum |
| 2003/0218558 A1 | 11/2003 | Mulder |
| 2004/0027185 A1 | 2/2004 | Fiedler |
| 2004/0146117 A1 | 7/2004 | Subramaniam |
| 2004/0155802 A1 | 8/2004 | Lamy |
| 2004/0161019 A1 | 8/2004 | Raghavan |
| 2004/0169529 A1* | 9/2004 | Afghahi ............ A01K 5/0114 327/51 |
| 2004/0170231 A1 | 9/2004 | Bessios |

(56) References Cited

U.S. PATENT DOCUMENTS

| | | |
|---|---|---|
| 2005/0134380 A1 | 6/2005 | Nairn |
| 2005/0174841 A1 | 8/2005 | Ho |
| 2005/0195000 A1 | 9/2005 | Parker |
| 2005/0201491 A1 | 9/2005 | Wei |
| 2005/0213686 A1 | 9/2005 | Love |
| 2005/0220182 A1 | 10/2005 | Kuwata |
| 2005/0270098 A1 | 12/2005 | Zhang |
| 2006/0036668 A1 | 2/2006 | Jaussi |
| 2006/0097786 A1 | 5/2006 | Su |
| 2006/0103463 A1 | 5/2006 | Lee |
| 2006/0126751 A1 | 6/2006 | Bessios |
| 2006/0140324 A1 | 6/2006 | Casper |
| 2006/0159005 A1 | 7/2006 | Rawlins |
| 2006/0233291 A1 | 10/2006 | Garlepp |
| 2007/0001723 A1 | 1/2007 | Lin |
| 2007/0002954 A1 | 1/2007 | Cornelius |
| 2007/0030796 A1 | 2/2007 | Green |
| 2007/0103338 A1 | 5/2007 | Teo |
| 2007/0182487 A1 | 8/2007 | Ozasa |
| 2007/0201546 A1 | 8/2007 | Lee |
| 2007/0204205 A1 | 8/2007 | Niu |
| 2007/0263711 A1 | 11/2007 | Kramer |
| 2007/0283210 A1 | 12/2007 | Prasad |
| 2008/0007367 A1 | 1/2008 | Kim |
| 2008/0012598 A1 | 1/2008 | Mayer |
| 2008/0104374 A1 | 5/2008 | Mohamed |
| 2008/0159448 A1 | 7/2008 | Anim-Appiah |
| 2008/0192621 A1 | 8/2008 | Suehiro |
| 2008/0317188 A1 | 12/2008 | Staszewski |
| 2009/0059782 A1 | 3/2009 | Cole |
| 2009/0115523 A1 | 5/2009 | Akizuki |
| 2009/0195281 A1* | 8/2009 | Tamura ............... G11C 7/1072 327/163 |
| 2009/0262876 A1 | 10/2009 | Arima |
| 2009/0316730 A1 | 12/2009 | Feng |
| 2009/0323864 A1 | 12/2009 | Tired |
| 2010/0046644 A1 | 2/2010 | Mazet |
| 2010/0081451 A1 | 4/2010 | Mueck |
| 2010/0148819 A1 | 6/2010 | Bae |
| 2010/0180143 A1 | 7/2010 | Ware |
| 2010/0215112 A1 | 8/2010 | Tsai |
| 2010/0235673 A1 | 9/2010 | Abbasfar |
| 2010/0271107 A1 | 10/2010 | Tran |
| 2010/0283894 A1 | 11/2010 | Horan |
| 2010/0296556 A1 | 11/2010 | Rave |
| 2010/0309964 A1 | 12/2010 | Oh |
| 2011/0028089 A1 | 2/2011 | Komori |
| 2011/0032977 A1 | 2/2011 | Hsiao |
| 2011/0051854 A1 | 3/2011 | Kizer |
| 2011/0072330 A1 | 3/2011 | Kolze |
| 2011/0074488 A1 | 3/2011 | Broyde |
| 2011/0084737 A1 | 4/2011 | Oh |
| 2011/0103508 A1 | 5/2011 | Mu |
| 2011/0127990 A1 | 6/2011 | Wilson |
| 2011/0228864 A1 | 9/2011 | Aryanfar |
| 2011/0235501 A1 | 9/2011 | Goulahsen |
| 2011/0268225 A1 | 11/2011 | Cronie |
| 2011/0299555 A1 | 12/2011 | Cronie |
| 2011/0302478 A1 | 12/2011 | Cronie |
| 2011/0317559 A1 | 12/2011 | Kern |
| 2012/0082203 A1 | 4/2012 | Zerbe |
| 2012/0133438 A1 | 5/2012 | Tsuchi |
| 2012/0152901 A1 | 6/2012 | Nagorny |
| 2012/0161945 A1 | 6/2012 | Single |
| 2012/0213299 A1 | 8/2012 | Cronie |
| 2013/0010892 A1 | 1/2013 | Cronie |
| 2013/0013870 A1 | 1/2013 | Cronie |
| 2013/0088274 A1 | 4/2013 | Gu |
| 2013/0106513 A1 | 5/2013 | Cyrusian |
| 2013/0114519 A1 | 5/2013 | Gaal |
| 2013/0114663 A1 | 5/2013 | Ding |
| 2013/0129019 A1 | 5/2013 | Sorrells |
| 2013/0147553 A1 | 6/2013 | Iwamoto |
| 2013/0188656 A1 | 7/2013 | Ferraiolo |
| 2013/0195155 A1 | 8/2013 | Pan |
| 2013/0202065 A1 | 8/2013 | Chmelar |
| 2013/0215954 A1 | 8/2013 | Beukema |
| 2013/0259113 A1 | 10/2013 | Kumar |
| 2013/0271194 A1 | 10/2013 | Pellerano |
| 2013/0307614 A1 | 11/2013 | Dai |
| 2013/0314142 A1 | 11/2013 | Tamura |
| 2013/0315501 A1 | 11/2013 | Atanassov |
| 2013/0346830 A1 | 12/2013 | Ordentlich |
| 2014/0159769 A1 | 6/2014 | Hong |
| 2014/0177645 A1* | 6/2014 | Cronie ................ H04L 1/0041 370/441 |
| 2014/0177696 A1 | 6/2014 | Hwang |
| 2014/0266440 A1 | 9/2014 | Itagaki |
| 2014/0269130 A1 | 9/2014 | Maeng |
| 2014/0286381 A1 | 9/2014 | Shibasaki |
| 2015/0049798 A1 | 2/2015 | Hossein |
| 2015/0070201 A1 | 3/2015 | Dedic |
| 2015/0078479 A1 | 3/2015 | Whitby-Strevens |
| 2015/0117579 A1 | 4/2015 | Shibasaki |
| 2015/0146771 A1 | 5/2015 | Walter |
| 2015/0222458 A1 | 8/2015 | Hormati |
| 2015/0249559 A1 | 9/2015 | Shokrollahi |
| 2015/0333940 A1 | 11/2015 | Shokrollahi |
| 2015/0349835 A1 | 12/2015 | Fox |
| 2015/0380087 A1* | 12/2015 | Mittelholzer ....... G06F 11/1072 714/766 |
| 2015/0381232 A1 | 12/2015 | Ulrich |
| 2016/0020796 A1 | 1/2016 | Hormati |
| 2016/0020824 A1 | 1/2016 | Ulrich |
| 2016/0036616 A1 | 2/2016 | Holden |
| 2016/0197747 A1 | 7/2016 | Ulrich |
| 2016/0261435 A1 | 9/2016 | Musah |
| 2017/0310456 A1 | 10/2017 | Tajalli |
| 2017/0317449 A1 | 11/2017 | Shokrollahi |
| 2017/0317855 A1 | 11/2017 | Shokrollahi |

FOREIGN PATENT DOCUMENTS

| | | |
|---|---|---|
| EP | 1926267 | 5/2008 |
| EP | 2039221 | 2/2013 |
| JP | 2003163612 | 6/2003 |
| WO | 2005002162 | 1/2005 |
| WO | 2009084121 | 7/2009 |
| WO | 2010031824 | 3/2010 |
| WO | 2011119359 | 9/2011 |

OTHER PUBLICATIONS

Abbasfar, A., "Generalized Differential Vector Signaling", IEEE International Conference on Communications, ICC '09, (Jun. 14, 2009), pp. 1-5.

Brown, L., et al., "V.92: The Last Dial-Up Modem?", IEEE Transactions on Communications, IEEE Service Center, Piscataway, NJ., USA, vol. 52, No. 1, Jan. 1, 2004, pp. 54-61. XP011106836, ISSN: 0090-6779, DOI: 10.1109/tcomm.2003.822168, pp. 55-59.

Burr, "Spherical Codes for M-ARY Code Shift Keying", University of York, Apr. 2, 1989, pp. 67-72, United Kingdom.

Cheng, W., "Memory Bus Encoding for Low Power: A Tutorial", Quality Electronic Design, IEEE, International Symposium on Mar. 26-28, 2001, pp. 199-204, Piscataway, NJ.

Clayton, P., "Introduction to Electromagnetic Compatibility", Wiley—Interscience, 2006.

Counts, L., et al., "One-Chip Slide Rule Works with Logs, Antilogs for Real-Time Processing," Analog Devices Computational Products 6, Reprinted from Electronic Design, May 2, 1985, 7 pages.

Dasilva et al., "Multicarrier Orthogonal CDMA Signals for Quasi-Synchronous Communication Systems", IEEE Journal on Selected Areas in Communications, vol. 12, No. 5 (Jun. 1, 1994), pp. 842-852.

Design Brief 208 Using the Anadigm Multiplier CAM, Copyright 2002 Anadigm, 6 pages.

Ericson, T., et al., "Spherical Codes Generated by Binary Partitions of Symmetric Pointsets", IEEE Transactions on Information Theory, vol. 41, No. 1, Jan. 1995, pp. 107-129.

Farzan, K., et al., "Coding Schemes for Chip-to-Chip Interconnect Applications", IEEE Transactions on Very Large Scale Integration (VLSI) Systems, vol. 14, No. 4, Apr. 2006, pp. 393-406.

(56) References Cited

OTHER PUBLICATIONS

Grahame, J., "Vintage Analog Computer Kits," posted on Aug. 25, 2006 in Classic Computing, 2 pages, http.//www.retrothing.com/2006/08/classic_analog_.html.
Healey, A., et al., "A Comparison of 25 Gbps NRZ & PAM-4 Modulation used in Legacy & Premium Backplane Channels", DesignCon 2012, 16 pages.
International Search Report and Written Opinion for PCT/EP2011/059279 dated Sep. 22, 2011.
International Search Report and Written Opinion for PCT/EP2011/074219 dated Jul. 4, 2012.
International Search Report and Written Opinion for PCT/EP2012/052767 dated May 11, 2012.
International Search Report and Written Opinion for PCT/US14/052986 dated Nov. 24, 2014.
International Search Report and Written Opinion from PCT/US2014/034220 dated Aug. 21, 2014.
International Search Report and Written Opinion of the International Searching Authority, dated Jul. 14, 2011 in International Patent Application S.N. PCT/EP2011/002170, 10 pages.
International Search Report and Written Opinion of the International Searching Authority, dated Nov. 5, 2012, in International Patent Application S.N. PCT/EP2012/052767, 7 pages.
International Search Report for PCT/US2014/053563, dated Nov. 11, 2014, 2 pages.
Jiang, A., et al., "Rank Modulation for Flash Memories", IEEE Transactions of Information Theory, Jun. 2006, vol. 55, No. 6, pp. 2659-2673.
Loh, M., et al., "A 3×9 Gb/s Shared, All-Digital CDR for High-Speed, High-Density I/O", Matthew Loh, IEEE Journal of Solid-State Circuits, Vo. 47, No. 3, Mar. 2012.
Notification of Transmittal of International Search Report and the Written Opinion of the International Searching Authority, for PCT/US2015/018363, dated Jun. 18, 2015, 13 pages.
Notification of Transmittal of the International Search Report and the Written Opinion of the International Searching Authority, or the Declaration for PCT/EP2013/002681, dated Feb. 25, 2014, 15 pages.
Notification of Transmittal of the International Search Report and the Written Opinion of the International Searching Authority, or the Declaration, dated Mar. 3, 2015, for PCT/US2014/066893, 9 pages.
Notification of Transmittal of the International Search Report and the Written Opinion of the International Searching Authority, or the Declaration, for PCT/US2014/015840, dated May 20, 2014. 11 pages.
Notification of Transmittal of the International Search Report and the Written Opinion of the International Searching Authority, or the Declaration, for PCT/US2014/043965, dated Oct. 22, 2014, 10 pages.
Notification of Transmittal of the International Search Report and the Written Opinion of the International Searching Authority, or the Declaration, for PCT/US2015/037466, dated Nov. 19, 2015.
Notification of Transmittal of the International Search Report and the Written Opinion of the International Searching Authority, or the Declaration, for PCT/US2015/039952, dated Sep. 23, 2015, 8 pages.
Notification of Transmittal of the International Search Report and the Written Opinion of the International Searching Authority, or the Declaration, for PCT/US2015/041161, dated Oct. 7, 2015, 8 pages.
Notification of Transmittal of the International Search Report and the Written Opinion of the International Searching Authority, or the Declaration, for PCT/US2015/043463, dated Oct. 16, 2015, 8 pages.

Oh, et al., Pseudo-Differential Vector Signaling for Noise Reduction in Single-Ended Signaling, DesignCon 2009.
Poulton, et al., "Multiwire Differential Signaling", UNC-CH Department of Computer Science Version 1.1, Aug. 6, 2003.
Schneider, J., et al., "ELEC301 Project: Building an Analog Computer," Dec. 19, 1999, 8 pages, http://www.clear.rice.edu/elec301/Projects99/anlgcomp/.
She et al., "A Framework of Cross-Layer Superposition Coded Multicast for Robust IPTV Services over WiMAX," IEEE Communications Society subject matter experts for publication in the WCNC 2008 proceedings, Mar. 31, 2008-Apr. 3, 2008, pp. 3139-3144.
Skliar et al., A Method for the Analysis of Signals: the Square-Wave Method, Mar. 2008, Revista de Matematica: Teoria y Aplicationes, pp. 109-129.
Slepian, D., "Premutation Modulation", IEEE, vol. 52, No. 3, Mar. 1965, pp. 228-236.
Stan, M., et al., "Bus-Invert Coding for Low-Power I/O, IEEE Transactions on Very Large Scale Integration (VLSI) Systems", vol. 3, No. 1, Mar. 1995, pp. 49-58.
Tallini, L., et al., "Transmission Time Analysis for the Parallel Asynchronous Communication Scheme", IEEE Transactions on Computers, vol. 52, No. 5, May 2003, pp. 558-571.
Tierney, J., et al., "A digital frequency synthesizer," Audio and Electroacoustics, IEEE Transactions, Mar. 1971, pp. 48-57, vol. 19, Issue 1, 1 page Abstract from http://ieeexplore.
Wang et al., "Applying CDMA Technique to Network-on-Chip", IEEE Transactions on Very Large Scale Integration (VLSI) Systems, vol. 15, No. 10 (Oct. 1, 2007), pp. 1091-1100.
Zouhair Ben-Neticha et al, "The 'streTched'—Golay and other codes for high-SNR fnite-delay quantization of the Gaussian source at 1/2 Bit per sample", IEEE Transactions on Communications, vol. 38, No. 12 Dec. 1, 1990, pp. 2089-2093, XP000203339, ISSN: 0090-6678, DOI: 10.1109/26.64647.
Notification of Transmittal of the International Search Report and the Written Opinion of the International Searching Authority, or the Declaration, dated Feb. 15, 2017, 10 pages.
Notification of Transmittal of the International Search Report and the Written Opinion of the International Searching Authority, or the Declaration., for PCT/US17/14997, dated Apr. 7, 2017.
Holden, B., "Simulation results for NRZ, ENRZ & PAM-4 on 16-wire full-sized 400GE backplanes", IEEE 802.3 400GE Study Group, Sep. 2, 2013, 19 pages, www.ieee802.0rg/3/400GSG/publiv/13_09/holden_400_01_0913.pdf.
Holden, B., "An exploration of the technical feasibility of the major technology options for 400GE backplanes", IEEE 802.3 400GE Study Group, Jul. 16, 2013, 18 pages, http://ieee802.org/3/400GSG/public/13_07/holden_400_01_0713.pdf.
Holden, B., "Using Ensemble NRZ Coding for 400GE Electrical Interfaces", IEEE 802.3 400GE Study Group, May 17, 2013, 24 pages, http://www.ieee802.org/3/400GSG/public/13_05/holden_400_01_0513.pdf.
Giovaneli, et al., "Space-frequency coded OFDM system for multiwire power line communications", Power Line Communications and Its Applications, 20015 International Symposium on Vancouver, BC, Canada, Apr. 6-8, 2005, Piscataway, NJ, pp. 191-195.
Shibasaki, et al., "A 56-Gb/s Receiver Front-End with a CTLE and 1-Tap DFE in 20-nm CMOS", IEEE 2014 Symposium on VLSI Circuits Digest of Technical Papers, 2 pgs.
Hidaka, et al., "A 4-Channel 1.25-10.3 Gb/s Backplane Transceiver Macro With35 dB Equalizer and Sign-Based Zero-Forcing Adaptive Control", IEEE Journal of Solid-State Circuits, vol. 44 No. 12, Dec. 2009, pp. 3547-3559.

* cited by examiner

VECTOR SIGNALING CODES WITH HIGH PIN-EFFICIENCY FOR CHIP-TO-CHIP COMMUNICATION AND STORAGE

CROSS REFERENCE TO RELATED APPLICATIONS

This application is a continuation of U.S. application Ser. No. 15/176,085, filed Jun. 7, 2016, which is a continuation of U.S. application Ser. No. 14/636,098, filed Mar. 2, 2015, entitled "CLOCK-EMBEDDED VECTOR SIGNALING CODES", which claims the benefit of U.S. Provisional Application No. 61/946,574 filed on Feb. 28, 2014, reference of which is hereby incorporated in its entirety.

REFERENCES

The following references are herein incorporated by reference in their entirety for all purposes:

U.S. Patent Publication No. 2011/0268225 of U.S. patent application Ser. No. 12/784,414, filed May 20, 2010, naming Harm Cronie and Amin Shokrollahi, entitled "Orthogonal Differential Vector Signaling" (hereinafter "Cronie I");

U.S. Patent Publication No. 2011/0302478 of U.S. patent application Ser. No. 12/982,777, filed Dec. 30, 2010, naming Harm Cronie and Amin Shokrollahi, entitled "Power and Pin Efficient Chip-to-Chip Communications with Common-Mode Resilience and SSO Resilience" (hereinafter "Cronie II");

U.S. patent application Ser. No. 13/030,027, filed Feb. 17, 2011, naming Harm Cronie, Amin Shokrollahi and Armin Tajalli, entitled "Methods and Systems for Noise Resilient, Pin-Efficient and Low Power Communications with Sparse Signaling Codes" (hereinafter "Cronie III");

U.S. Provisional Patent Application No. 61/763,403, filed Feb. 11, 2013, naming John Fox, Brian Holden, Ali Hormati, Peter Hunt, John D Keay, Amin Shokrollahi, Anant Singh, Andrew Kevin John Stewart, Giuseppe Surace, and Roger Ulrich, entitled "Methods and Systems for High Bandwidth Chip-to-Chip Communications Interface" (hereinafter called "Fox I");

U.S. Provisional Patent Application No. 61/773,709, filed Mar. 6, 2013, naming John Fox, Brian Holden, Peter Hunt, John D Keay, Amin Shokrollahi, Andrew Kevin John Stewart, Giuseppe Surace, and Roger Ulrich, entitled "Methods and Systems for High Bandwidth Chip-to-Chip Communications Interface" (hereinafter called "Fox II");

U.S. Provisional Patent Application No. 61/812,667, filed Apr. 16, 2013, naming John Fox, Brian Holden, Ali Hormati, Peter Hunt, John D Keay, Amin Shokrollahi, Anant Singh, Andrew Kevin John Stewart, and Giuseppe Surace, entitled "Methods and Systems for High Bandwidth Communications Interface" (hereinafter called "Fox III");

U.S. patent application Ser. No. 13/842,740, filed Mar. 15, 2013, naming Brian Holden, Amin Shokrollahi, and Anant Singh, entitled "Methods and Systems for Skew Tolerance and Advanced Detectors for Vector Signaling Codes for Chip-to-Chip Communication" (hereinafter called "Holden I");

U.S. patent application Ser. No. 13/895,206, filed May 15, 2013, naming Roger Ulrich and Peter Hunt, entitled "Circuits for Efficient Detection of Vector Signaling Codes for Chip-to-Chip Communications using Sums of Differences" (hereinafter called "Ulrich I").

U.S. Provisional Patent Application No. 61/934,804, filed Feb. 2, 2014, naming Ali Hormati and Amin Shokrollahi, entitled "Methods for Code Evaluation Using ISI Ratio" (hereinafter called "Hormati I").

U.S. Provisional Patent Application No. 61/839,360, filed Jun. 23, 2013, naming Amin Shokrollahi, entitled "Vector Signaling Codes with Reduced Receiver Complexity" (hereinafter called "Shokrollahi I").

U.S. Patent Application No. 61/934,800, filed Feb. 2, 2014, naming Amin Shokrollahi and Nicolae Chiurtu, entitled "Low EMI Signaling for Parallel Conductor Interfaces" (hereinafter called "Shokrollahi II").

U.S. patent application Ser. No. 13/843,515, filed Mar. 15, 2013, naming Harm Cronie and Amin Shokrollahi, entitled "Differential Vector Storage for Dynamic Random Access Memory" (hereinafter called "Cronie IV").

The following additional references to prior art have been cited in this application:

Publication by D. Slepian, *Permutation modulation*, published in the Proceedings of the IEEE, Vol. 53, No 3, March. 1965, pages 228-236 (hereafter called "Slepian I").

TECHNICAL FIELD

The present invention relates to communications in general and in particular to the transmission of signals capable of conveying information and detection of those signals in chip-to-chip communication.

BACKGROUND

In communication systems, a goal is to transport information from one physical location to another. It is typically desirable that the transport of this information is reliable, is fast and consumes a minimal amount of resources. One common information transfer medium is the serial communications link, which may be based on a single wire circuit relative to ground or other common reference, or multiple such circuits relative to ground or other common reference. A common example uses singled-ended signaling ("SES"). SES operates by sending a signal on one wire, and measuring the signal relative to a fixed reference at the receiver. A serial communication link may also be based on multiple circuits used in relation to each other. A common example of the latter uses differential signaling ("DS"). Differential signaling operates by sending a signal on one wire and the opposite of that signal on a matching wire. The signal information is represented by the difference between the wires, rather than their absolute values relative to ground or other fixed reference.

There are a number of signaling methods that maintain the desirable properties of DS while increasing pin efficiency over DS. Vector signaling is a method of signaling. With vector signaling, a plurality of signals on a plurality of wires is considered collectively although each of the plurality of signals might be independent. Each of the collective signals is referred to as a component and the number of plurality of wires is referred to as the "dimension" of the vector. In some embodiments, the signal on one wire is entirely dependent on the signal on another wire, as is the case with DS pairs, so in some cases the dimension of the vector might refer to the number of degrees of freedom of signals on the plurality of wires instead of exactly the number of wires in the plurality of wires.

With binary vector signaling, each component or "symbol" of the vector takes on one of two possible values. With non-binary vector signaling, each symbol has a value that is a selection from a set of more than two possible values. Any suitable subset of a vector signaling code denotes a "sub code" of that code. Such a subcode may itself be a vector signaling code.

A vector signaling code, as described herein, is a collection C of vectors of the same length N, called codewords, a second collection Λ of vectors of length N+1, called multi-input comparators (MIC's) comparing a linear combination of the values on the wires against another linear combination, and a set of "Inactive" elements wherein each inactive is a pair (c, λ), c being an element of C, and λ being an element of Λ. A pair (c, λ) that is not inactive is called "active." In operation, the coordinates of the codewords are bounded, and we choose to represent them by real numbers between −1 and 1. The ratio between the binary logarithm of the size of C and the length N is called the pin-efficiency of the vector signaling code.

In operation, a MIC represented by a vector $(m_1, \ldots, m_N, m_{N+1})$ calculates the sign of the scalar product of the vector $(m_1, \ldots, m_N)$ with the vector of the N values on the wires, compares the outcome against the value $m_{N+1}$, also called the reference of the MIC, and outputs a binary value corresponding to the computed sign. A MIC with reference 0 is called "central." A central MIC with the property that the sum of its coordinates is 0 as well is called "common mode resistant." This is because the operation of this MIC is independent of changing the values of all the wires by the same "common mode" value. If all MIC's are central, then we remove the final coordinate (i.e., the reference) of the MIC, and represent the MIC by its N first coordinates only.

In operation, a codeword is uniquely determined by the vector of signs of scalar products of that codeword c with all the MIC's λ, for which (c, λ) is active.

A vector signaling code is called "balanced" if for all its codewords the sum of the coordinates is always zero. Balanced vector signaling codes have several important properties. For example, as is well-known to those of skill in the art, balanced codewords lead to lower electromagnetic interference (EMI) noise than non-balanced ones. Also, if common mode resistant communication is required, it is advisable to use balanced codewords, since otherwise power is spent on generating a common mode component that is cancelled at the receiver.

Another fundamental parameter of a vector signaling code is its ISI ratio as defined in Hormati I: the ISI ratio of a MIC X for the given set C of codewords is the ratio of the largest scalar product $|\langle\lambda,c\rangle|$ to the smallest scalar product $|\langle\lambda,d\rangle|$ for all codewords c and d such that (c, λ) and (d, λ) are active. A code is said to have ISI ratio x if x is the maximum of the ISI ratios of its MIC's. As taught by Hormati I, the lower the ISI ratio, the less susceptible the vector signaling code is to intersymbol interference noise.

For example, DS is a vector signaling code of length 2, and pin-efficiency 1/2 consisting of the codewords (1, −1) and (−1, 1). The set Λ of MIC's contains one MIC only, given by the vector (1, −1). DS is balanced and has ISI ratio 1.

A class of vector signaling codes disclosed in Cronie II is the class of permutation modulation or PM codes of Slepian, first described in Slepian I for other communication settings. These codes have the property that each codeword is a permutation of a vector $x_0$. The vector $x_0$ is called the generator of the signal constellation and the signal constellation defines a permutation modulation code. In a preferred embodiment the vector $x_0$ is defined by a sequence of m integers $$l_0 \leq l_1 \leq \square \leq l_{m-1}.$$ (Eqn. 1)

It follows that $$N = \sum_{i=0}^{m-1} l_i.$$

The generator $x_0$ may have the form $$x_0 = (\underbrace{a_0, \ldots, a_0}_{l_0} | \underbrace{a_1, \ldots, a_1}_{l_1} | \ldots | \underbrace{a_{m-1}, \ldots, a_{m-1}}_{l_{m-1}})$$ (Eqn. 2)

where $a_0$ to $a_{m-1}$ are non-zero numbers such that $$\sum_{i=0}^{m-1} l_i a_i = 0.$$

PM-codes have a number of important and practically relevant properties. For example, they can be detected using common-mode resistant comparators. In very high speed applications, and where there is expectation that a reference value may be subject to change depending on the communications conditions, reference-less comparators often lead to a higher signal margin and hence to a higher integrity of the recovered signals. Moreover, since the net current sum on all the interface wires is zero, this type of vector signaling code produces less EMI noise than otherwise; in addition, since no energy is launched into the common mode of the wires, this type of signaling is also efficient in terms of the power it uses.

An example of a typical systems environment incorporating vector signaling code communication is shown in FIG. 1.

Information to be transmitted 100 is obtained from a source SRC and presented to transmitter 120. Within the transmitter, the information is encoded 122 as symbols of a vector signaling code 125, which are then presented to transmit driver 128, generating physical representations of the code symbols on a collection of wires 145 which together comprise the communications channel 140.

Receiver 160 accepts physical signals from communications channel 140, detects the received codewords using, as one example, a collection of differential binary MIC's 166, and then decodes 168 those detected values 167 to obtain the received information 180 output to a destination device DST.

In a practical embodiment, signals 145 may undergo significant change in amplitude, waveform, and other characteristics between emission by transmitter 120 and arrival at receiver 160, due to the transmission characteristics of communications channel 140. Therefore, it is common practice to incorporate signal amplification and/or equalization 162 into communications channel receivers.

Examples of vector signaling methods are described in Cronie I, Cronie II, Cronie III, Fox I, Fox II, Fox III, Holden I, Shokrollahi I, Shokrollahi II, and Hormati I. For these vector signaling codes, the comparators 166 are all common mode resistant, i.e., they compare a linear combination of some of the values against a linear combination of some other values, and the sum of the weights of each of these linear combinations is the same.

BRIEF DESCRIPTION

An alternative type of vector signaling codes is described which have a larger pin-efficiency than normal vector signaling codes, may be received using comparators requiring at most one fixed reference voltage, and which can allow for a better immunity to ISI-noise than conventional multilevel signaling such as PAM-X. This alternative type of vector signaling codes are also particularly applicable to applications requiring the efficient and reliable storage of information, one example being Dynamic memory devices.

DETAILED DESCRIPTION

The use of vector signaling codes offers the possibility of increased pin-efficiency, as well as immunity from common mode and other noise. However, some applications may require vector signaling codes of even higher pin-efficiency. Such applications may, for example, be applications in which single-ended signaling performs fine at a given target transmission rate, but would perform much worse if the transmission rate was increased—for example because of a deep notch in the channel response. Traditionally, practitioners in the field have suggested the use of Pulse Amplitude Modulation (PAM) signaling to increase the pin-efficiency of such a system. PAM is a method of signaling in which the coordinates of a codeword can take one of the values $[-1, -1+2/(X-1), \ldots, 1-2/(X-1), 1]$. This type of signaling is referred to as PAM-X signaling. Often, but not exclusively, X is a power of 2 and each codeword carries $\log 2(X)$ (binary logarithm of $\lambda$) information bits.

One of the disadvantages of PAM-X signaling for large values of X is the need for many fixed references. In such a signaling method, $X-1$ references must be maintained during operation. In some applications (such as the memory applications discussed below) such references may be difficult to establish. In other applications, such as in chip-to-chip communication, the references may be subject to noise that can erode the signal integrity. Moreover, PAM-X signaling can be sensitive to Intersymbol Interference (ISI) noise, as described in Hormati I.

An alternative type of vector signaling codes is now described in which the receive comparators use at most one reference (called "0" in the following), which have a larger pin-efficiency than normal vector signaling codes, and which can allow for a better immunity to ISI-noise than PAM-X signaling.

A Permutation Modulation vector signaling code of type II (PM-II code, for short) is a vector signaling code in which each codeword is of the form $$(\pm c_0, \pm c_1, \square, \pm c_{N-1})$$

wherein $(c_0, \ldots, c_{N-1})$ is an element of a permutation modulation code generated by a vector $x_0$. In other words, in this type of coding all permutations of $x_0$ are used, and the signs of all coordinate positions can be independently modulated.

Detection for PM-II codes can be accomplished using a network of $N^2$ comparators. Given the values $x_0, x_1, \ldots, x_{N-1}$ on the N wires, the list of comparators is given by:

$N*(N-1)/2$ comparators comparing $x_i$ against $x_j$ for $0 \le i < j < N$.

$N*(N-1)/2$ comparators comparing $x_i + x_j$ against 0 for $0 \le i < j < N$.

N comparators comparing $x_i$ against 0 for $0 \le i < N$.

Figure 1:
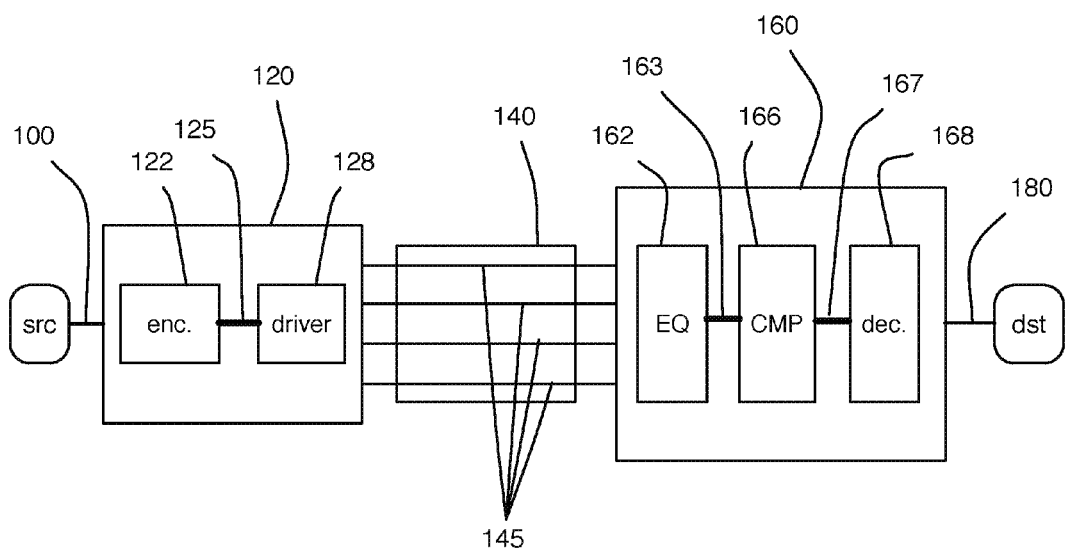
FIG. 1 is a block diagram of a typical prior art vector signaling code system.
Figure 2:
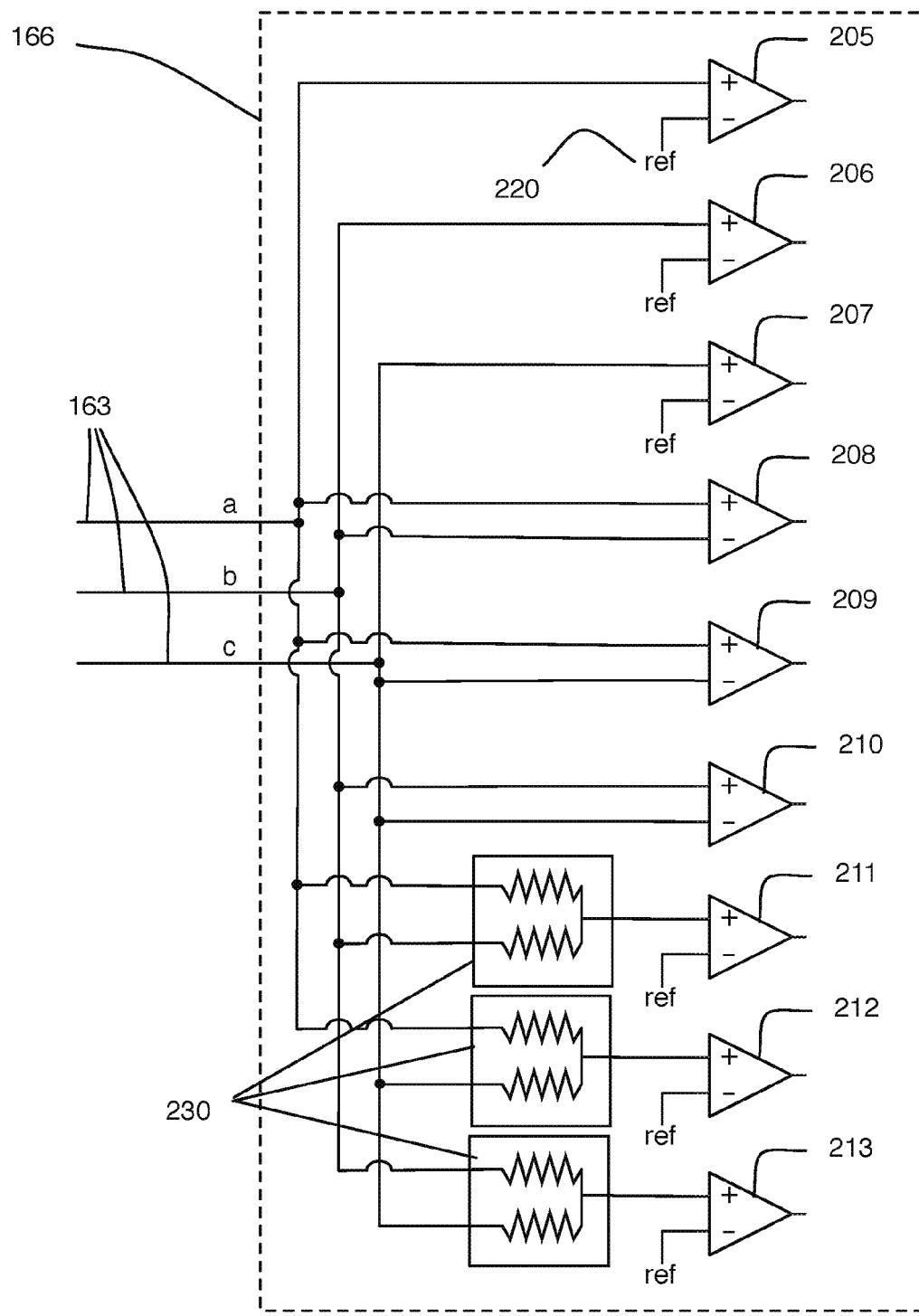
FIG. 2 is a schematic of an embodiment of a receive codeword detector in accordance with at least one aspect of the present invention, acting as a detector of a PM-II code on 3 communication wires.

FIG. 2 is a schematic of an embodiment of a receive codeword detector as in FIG. 1, in accordance with at least one aspect of the present invention, acting as a detector of a PM-II code on 3 communication wires. The three wires 163 leaving the equalizer unit 162 of FIG. 1 and entering the CMP unit 166 are shown. They carry the values a, b, and c, respectively. The CMP unit comprises 9 comparators 205, 206, . . . , 213, and three adder units 230, implemented in this example as averaging units using two parallel resistors of equal resistance. The comparators 205, 206, 207 and 211, 212, and 213 have one of their legs connected to a fixed reference. The value of that reference depends on the particular values put on the wires. Specifically, comparator 205 compares the value a against ref, comparator 206 compares the value b against ref, and comparator 207 compares the value c against ref. Comparator 211 compares $(a+b)/2$ against ref, comparator 212 compares $(a+c)/2$ against ref, and comparator 213 compares $(b+c)/2$ against ref. Comparators 208, 209, and 210 are differential comparators. They compare a against b, a against c, and b against c, respectively. In some application, the signals entering the CMP unit 166 may have been amplified by an amplifier; alternatively, part of these signals may be amplified before entering the comparators. For example, the signals leaving the adder units 230 may be amplified before entering their respective adder units in order to create a larger vertical opening for the eye diagrams.

In the following, we will give some examples of PM-II codes.

EXAMPLE 1

2-Dimensional PM-II Code

A 2-dimensional PM-II code is specified by a vector $x_0 = (a,b)$. Since the signals on the wires are assumed to be in the interval $[-1,1]$, the parameter a can be assumed to be equal to 1, and b can be assumed to be non-negative.

Described as 2-dimensional vectors, the comparators are $(1,-1)$, $(1,1)$, $(1,0)$ and $(0,1)$, meaning that upon reception of values $(x,y)$ on the wires (after possible equalization), the comparators compare x against y (or x−y against 0), x+y against 0, x against 0, and y against 0.

Figure 3:
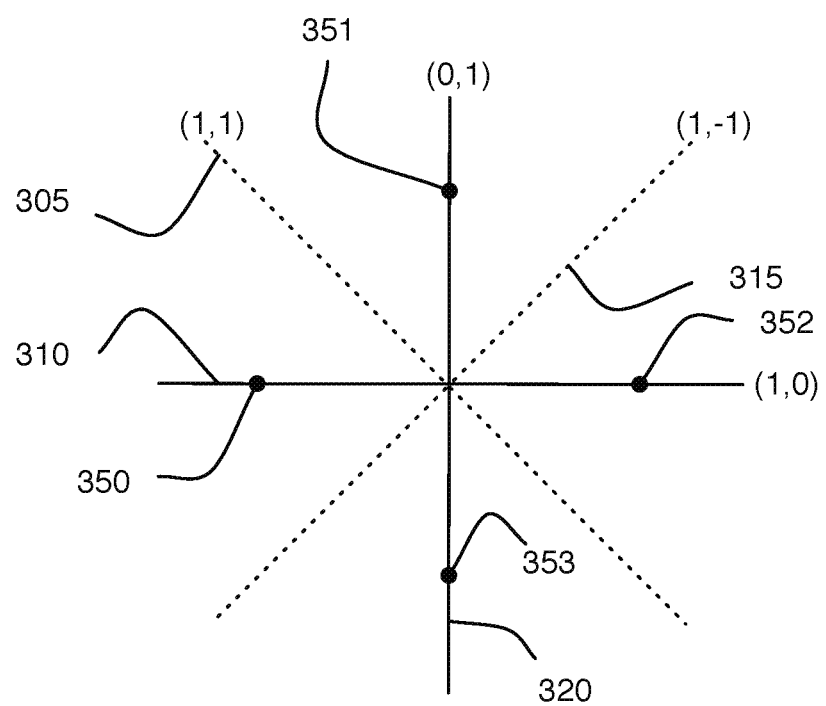
FIG. 3 illustrates the signal constellation and required comparators for one 2-dimensional PM-II code in accordance with the invention.

If b is zero, then the code has 4 elements only, and the codewords are $(1,0)$, $(-1,0)$, $(0,1)$, and $(0,-1)$. The two comparators $(1,-1)$ and $(1,1)$ are sufficient to detect the codewords, so there is no need for the other two comparators. This code has ISI ratio 1. FIG. 3 shows the constellation of these points in the plane, together with the comparators. Specifically, the codewords are the black circles 350, 351, 352, and 353, having coordinates $(-1,0)$, $(0,1)$, $(1,0)$, and $(0,-1)$, respectively. The comparators are shown by the four lines 305, 310, 315, and 320, labeled as $(1,0)$, $(1,1)$, $(1,-1)$, and $(0,1)$, respectively. As can be seen, the comparators $(1,-1)$ and $(1,1)$ are not needed to distinguish the four codewords.

If b is nonzero, then the code has 8 elements. Optimization of the code can be done by minimizing the ISI-ratio:

The comparators $(1,0)$ and $(0,1)$ both have ISI-ratio $1/b$.

The comparators $(1,-1)$ and $(-1,1)$ both have ISI-ratio $(1+b)/(1-b)$ if b is not 1.

Figure 4:
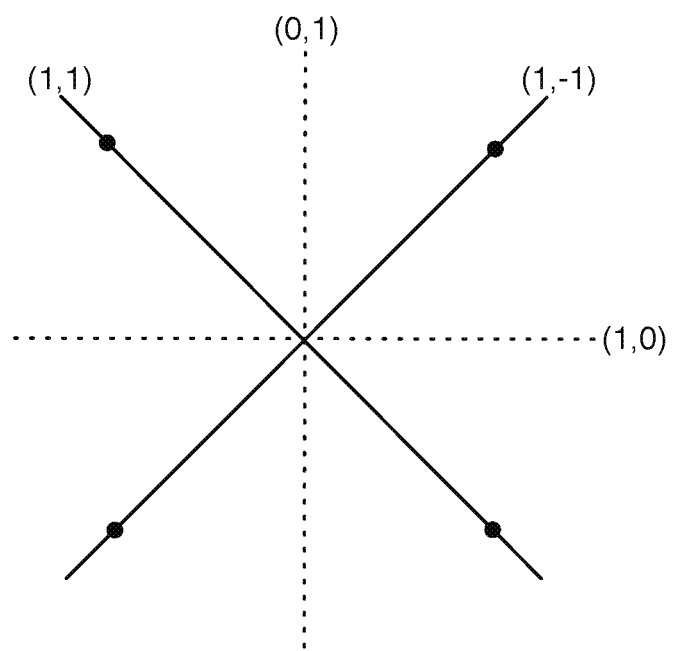
FIG. 4 illustrates the signal constellation and required comparators for a second 2-dimensional PM-II code in accordance with the invention.

If b=1, then these comparators are not needed, and the vector signaling code is that of single-ended signaling, as can be seen in FIG. 4. As can be seen, the comparators $(1,0)$ and $(0,1)$ are not needed to distinguish the codewords, shown as black circles.

Figure 5:
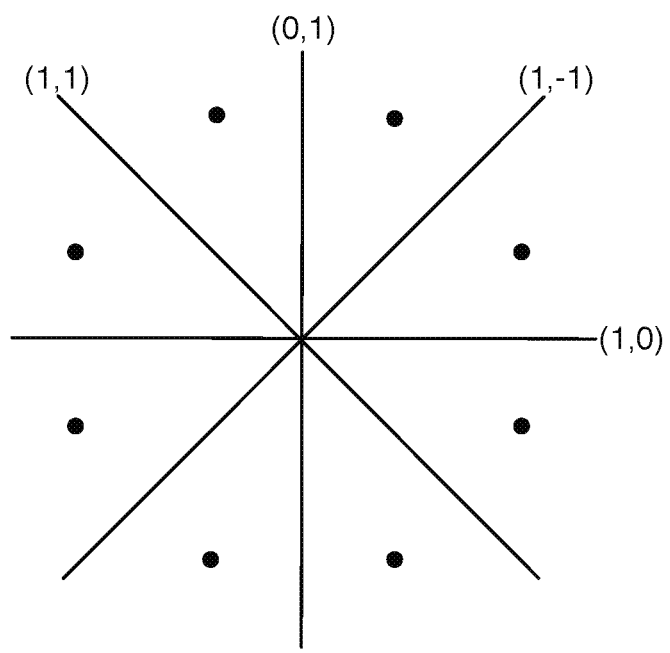
FIG. 5 illustrates the signal constellation and required comparators for a third 2-dimensional PM-II code in accordance with the invention.

If b is not 1, then the best ISI-ratio is obtained if $1/b=(1+b)/(1-b)$, which means that $b=\sqrt{2}-1$. In this case the codewords are equidistantly distributed on the circle with radius $\sqrt{4-2\sqrt{2}}$, as shown in FIG. 5. As can be seen from the figure, all four comparators are needed to distinguish the codewords. This code has a pin-efficiency of 1.5, and an ISI-ratio of $\sqrt{2}+1 \sim 2.41$.

The exact PM-II code generated by $(1, \sqrt{2}-1)$ may not be used as is in practice, due to the difficulty of generating a voltage level exactly equal to $\sqrt{2}-1$ on the wires. A quantization of this value is therefore desirable. There are various possibilities of quantization, depending on the allowed precision. One possibility would be to replace the quantity $\sqrt{2}-1$ by 0.4. The new code, called PM2-2, would then have the codewords (1,0.4), (0.4, 1), (−0.4,1), (−1,0.4),
(−1,−0.4), (−0.4,−1), (0.4,−1), (1,−0.4).

The ISI-ratio of the comparators (1,0) and (0,1) for this code are 2.5, and the ISI-ratios of the comparators (1,1) and (1,−1) are 7/3~2.33. There is thus a slight loss of ISI-ratio for the first two comparators.

Figure 6:
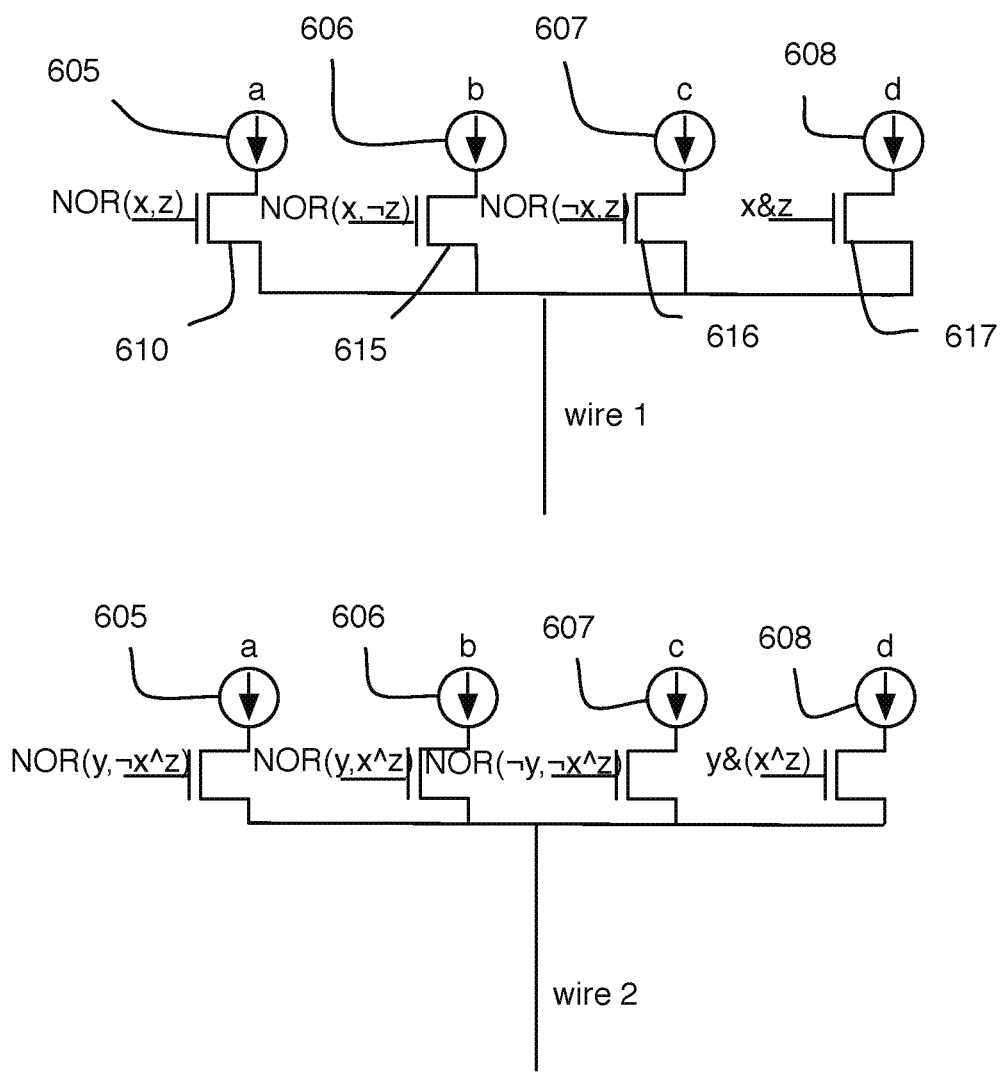
FIG. 6 is a schematic of one embodiment of a driver transmitting three bits on two wires, in accordance with at least one aspect of the invention.

No matter what values are chosen for the coordinates of the generating vector in this case, digital logic may be needed to determine which value is transmitted on the two wires. FIG. 6 is an exemplary embodiment of a driver 128 of FIG. 1 sending three bits on two wires. We assume that the three incoming bits are called x, y, z, and we assume that the levels transmitted on the wires are a, b, c, d. In this case the driver may comprise four current sources 605, 606, 607, 608, creating currents of strengths a, b, c, d, respectively. The same current sources are used for both wires 1 and 2, since the coding would never allow the same current to be replicated on both wires. These current sources may be connected to transistors 610, 615, 616, and 617, which are controlled by logical functions of the incoming bits x, y, z. In this exemplary embodiment, the control signals may be NOR(x,z), NOR(x,¬z), NOR(¬x,z)=1, and x&z, where x&z is the logical and of x and z, and ¬x is the logical negation of x. This means that the current flowing on wire 1 is equal to a, b, c, or d if NOR(x,z)=1, or NOR(x,¬z)=1, or NOR(¬x,z)=1, or x&z=1, respectively. The control logic makes sure that for every combination of the incoming bits exactly one of the current sources opens.

Similarly, the value on the second wire is a, b, c, or d, if NOR(y, ¬xˆz)=1, or NOR(y, xˆz)=1, or NOR(¬y, ¬xˆz)=1, or y&(xˆz)=1, respectively, where uˆv indicates the logical XOR of u and v.

Figure 7:
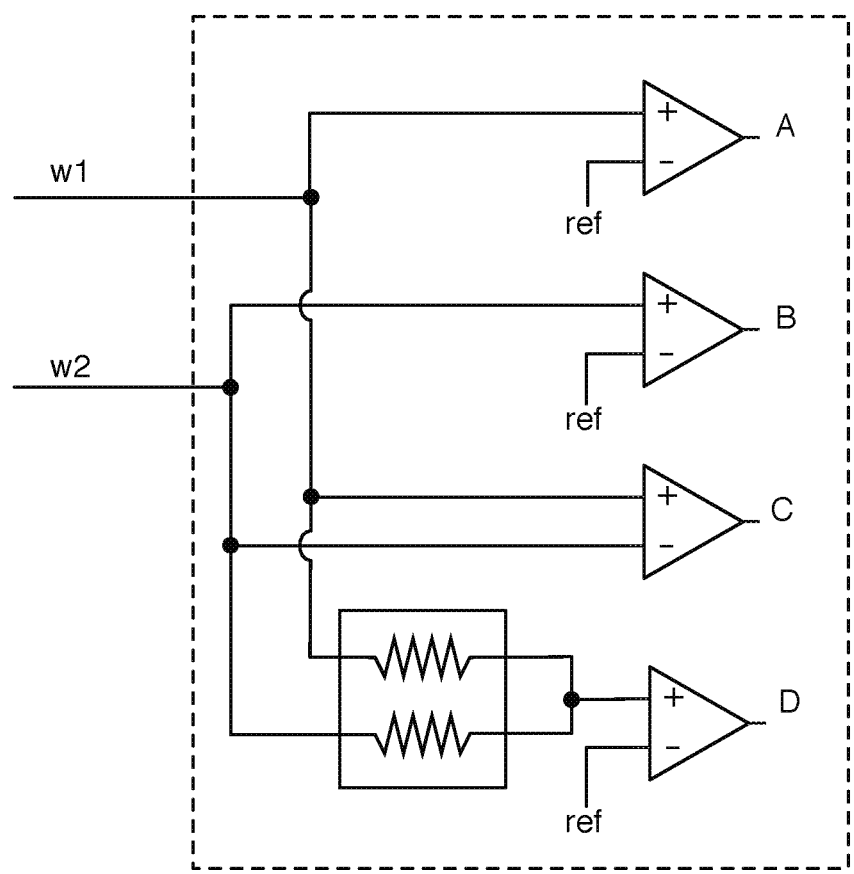
FIG. 7 is a schematic of one comparator embodiment to detect a code transmitting three bits on two wires, in accordance with at least one aspect of the invention.

FIG. 7 shows the operation of one embodiment of the comparators needed for this coding scheme. In this figure, w1 and w2 are the values on the two wires of the communication system, possibly after an equalization step. These values collectively enter four comparators, which produce digital values A, B, C, and D, respectively. In operation, the first two comparators compare the values w1 and w2 on the two wires against a fixed reference, respectively. The third comparator compares the values w1 and w2. For the fourth comparator, the values on the wires pass two resistors of equal resistance, so that the value at the black dot equals (w1+w2)/2. This value is then compared by the fourth comparator against a fixed reference to obtain the bit D. Where the possible values on the wires are a, b, c, d, the value of the reference is the average (a+b+c+d)/4.

One familiar with the art will note that the multiple input comparators (MIC) taught in Holden I provide an efficient alternative embodiment of the required average calculation and comparison operations. In one embodiment of a MIC, a conventional comparator input circuit is modified by incorporating multiple paralleled transistors on one or both sides of the usual differential amplifier input stage. Scaling of the relative transistor sizes may be used to introduce proportionate factors, as required for an averaging function.

Figure 8:
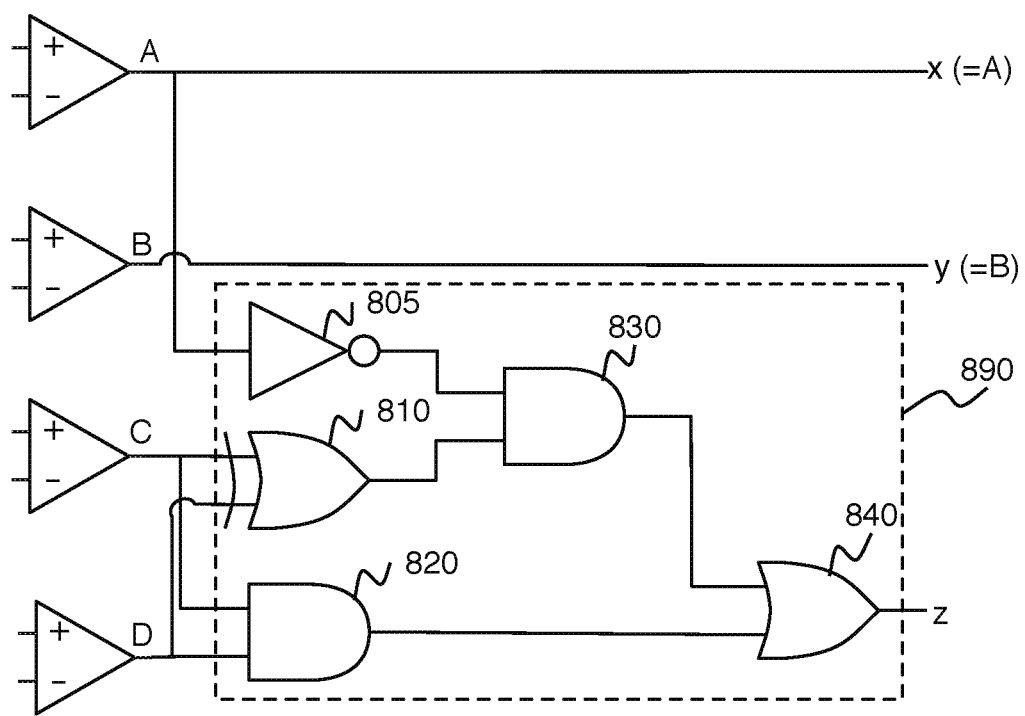
FIG. 8 shows one embodiment of a decoder which may be combined with the comparators of FIG. 7 to receive and decode three bits transmitted on two wires in accordance with the invention.

An exemplary embodiment of the operation of a decoder is now described with reference to FIG. 8. The input to this decoder are the four bits A, B, C, D from the four comparators. The output are the bits x, y, z. The bits x and y are equal to A and B, respectively. The decoder comprises two AND gates 820 and 830, inverter 805, an XOR gate 810, and an OR gate 840. The output of the AND gate 830 is (¬A)&(CˆD). The output of the AND gate 820 is C&D. The final output z of the OR gate 840 is (C&D)|(¬A)&(CˆD), where "|" is the OR operation.

Figure 14:
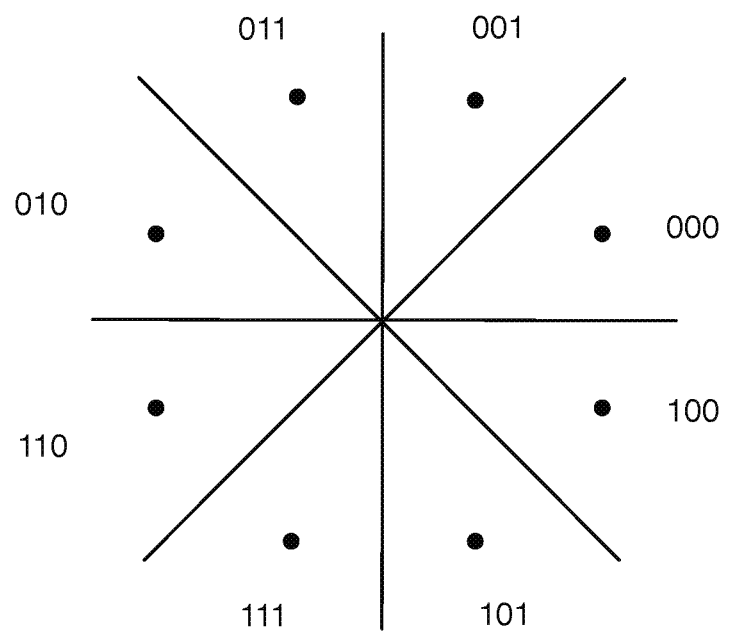
FIG. 14 illustrates the signal constellation and required comparators for a simplified set of comparators mapping groups of 3 bits to codewords.
Figure 15:
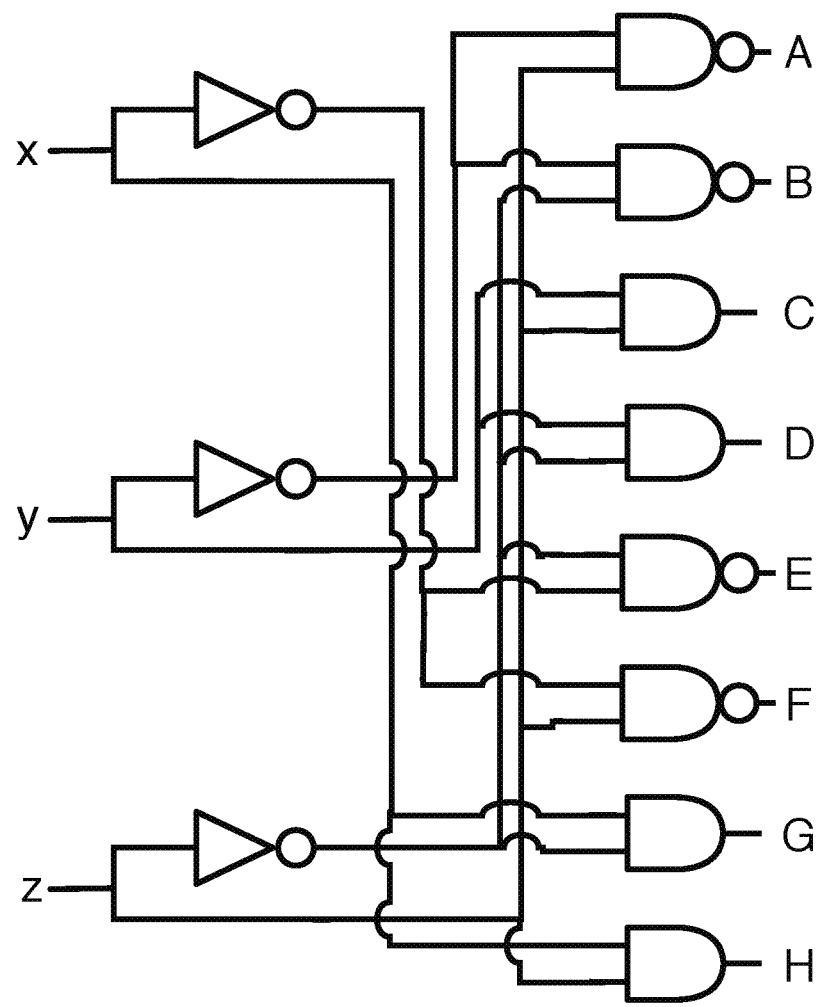
FIG. 15 is a schematic for one embodiment of an encoder circuit mapping 3 input bits to eight encoded outputs based on the mapping of FIG. 15.
Figure 16:
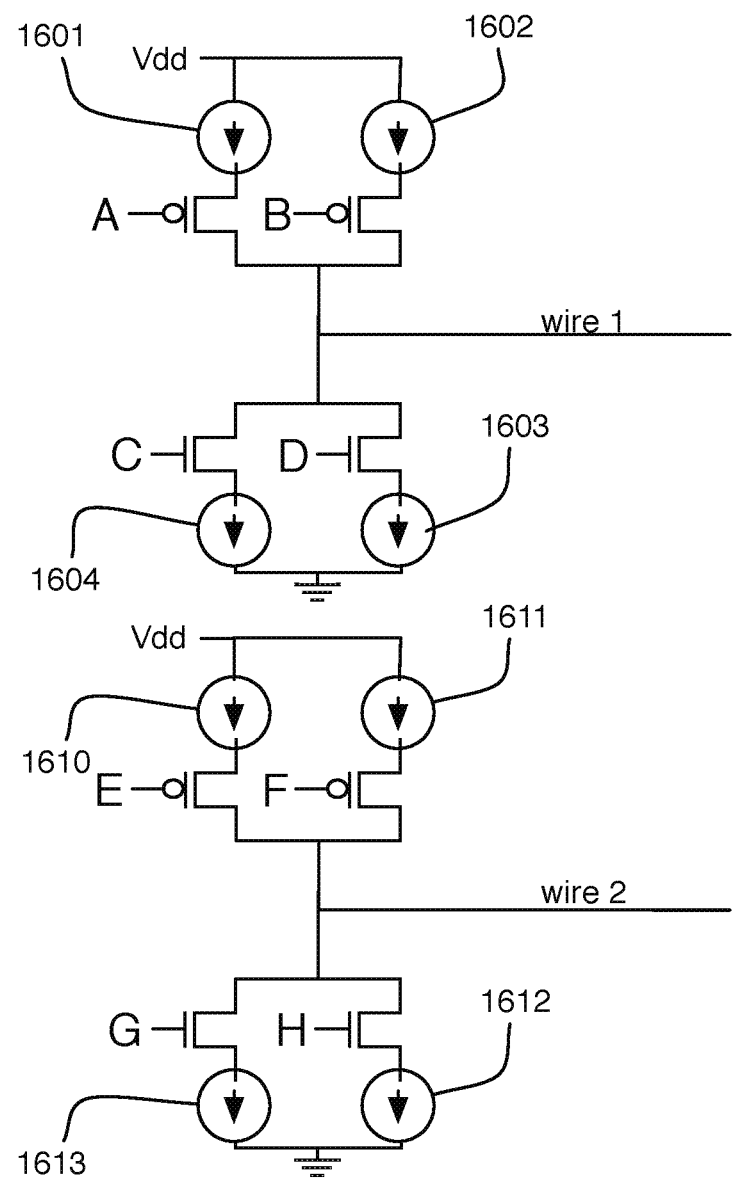
FIG. 16 is a schematic for one embodiment of an output driver for each of the communication wires using the encoding of FIG. 17.
Figure 17:
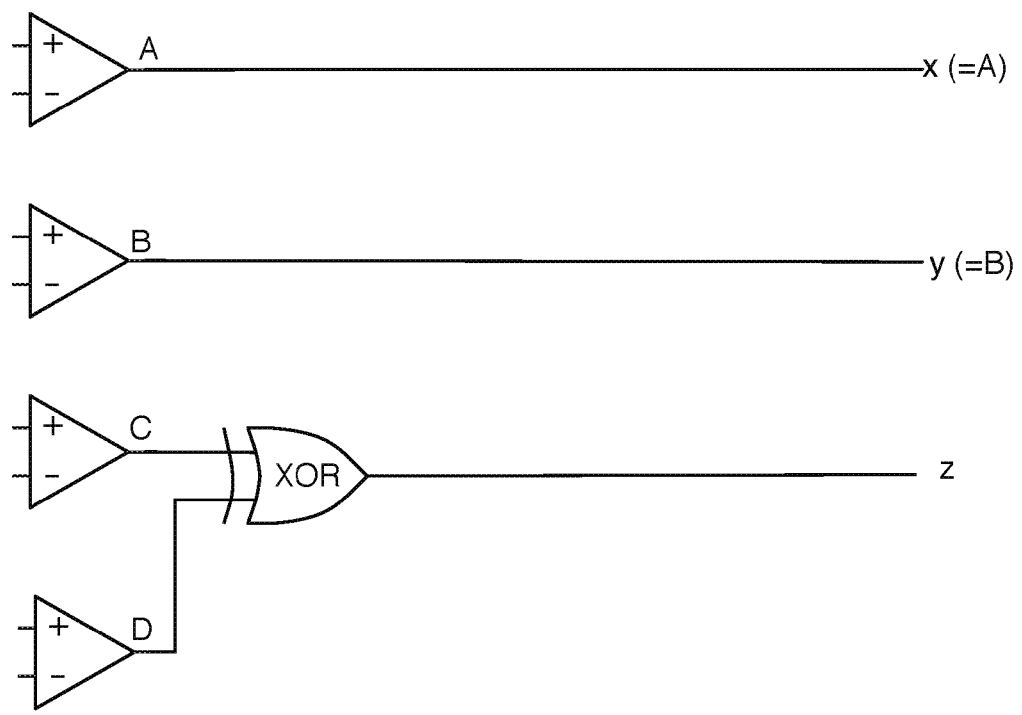
FIG. 17 is a schematic for one embodiment of a decoder based on the mapping of FIG. 15.

Other encodings with reduced complexity decoders are also possible, as illustrated in FIGS. 14-17. In FIG. 14 a mapping from groups of three bits to the codewords is described. FIG. 15 describes a logical circuit which, on input three bits x, y, z, produces 8 outputs A, B, . . . , H. For example, A is equal to NAND($\neg$y,z). FIG. 16 describes a driver structure for each of the communication wires. Elements 1601, 1602, 1610, and 1611 are source currents, wherein source currents 1701 and 1710 provide a current of strength $\sqrt{2}-1$ and source currents 1602 and 1611 provide a current of strength 1. Similarly, elements 1604 and 1613 are sink currents of strength $\sqrt{2}-1$ and elements 1603 and 1612 provide sink currents of strength 1. The source currents are connected to PMOS transistors, whereas the sink currents are connected to NMOS transistors. The control bits for these transistors are given by the outputs of the logical encoder of FIG. 15. An exemplary embodiment of the operation of a decoder is now described with reference to FIG. 17. The input to this decoder are the four bits A, B, C, D from the four comparators. The output are the bits x, y, z. The bits x and y are equal to A and B, respectively. Bit z is equal to the XOR of the outputs of the third and fourth comparator.

EXAMPLE 2

3-Dimensional PM-II Codes

The generating vector $x_0$ can be assumed to be of the form (1, a, b) where $1 \geq a \geq b \geq 0$.
  If b$\neq$a, then b can be chosen to be $2-\sqrt{5}$ and a can be chosen to be $(1+b)/2=(3-\sqrt{5})/2$. This gives a code with 48 codewords, and an ISI-ratio of $2+\sqrt{5} \sim 4.24$.
  If b=a, and a$\neq$1, then b can be chosen to be $\sqrt{2}-1$. This gives a code with 24 codewords and an ISI-ratio of $\sqrt{2}+1 \sim 2.41$. This code has inactives consisting of pairs of codewords and MIC's such that the value of the MIC at that codeword is 0.
  If b=a=1, then the corresponding code is the 3-dimensional single-ended code, and only three of the comparators are needed to distinguish the codewords.

Reference-less Vector Signaling Codes from Arbitrary PM-II Codes

PM-II codes as described herein have comparators that compare their values against 0. In fact, up to $N*(N+1)/2$ such comparators can be of this type. In many high-speed applications, it is desirable to have codewords whose values sum to zero, and comparators that reject common mode noise and are "differential" in the sense that they only compare linear combinations of wire values against one another. In the language of vector signaling codes above, in this setting the codewords c of the vector signaling code should satisfy the property $\Sigma_{i=0}^{N-1} c_i = 0$, and the comparators $\lambda$ should satisfy $\Sigma_{i=0}^{N-1} \lambda_i = 0$. For example, permutation modulation codes have this property. In certain applications, however, such permutation modulation codes may not be suitable, for example because their pin-efficiency may not be high enough.

A method is now described to produce reference-less vector signaling codes from PM-II codes. Where a PM-II code of length N is used, the first step of the procedure requires the determination of an orthogonal matrix M of format (N+1)×(N+1). A matrix is called orthogonal if all pairs of distinct rows of the matrix are orthogonal and all rows have Euclidean norm 1. For example, in the matrix below, M below is orthogonal:

$$M = \frac{1}{\sqrt{2}} \begin{pmatrix} 1 & 1 \\ 1 & -1 \end{pmatrix}.$$

In addition to orthogonality, the matrix M needs to satisfy the condition that the sum of all columns of M is an N-dimensional vector that is 0 in all positions except for the first. (Strictly, whether the nonzero position is the first or any other fixed position is irrelevant for the working of this method; the first position was chosen for descriptive purposes.)

Given this matrix, the PM-II code C and the set of MIC's $\Lambda$ can be transformed to obtain a vector signaling code that is reference-less and balanced. To accomplish this, the codewords $c=(c_0, \ldots, c_{N-1})$ of dimension N are transformed to codewords $d=(d_0, \ldots, d_N)$ of dimension N+1 via $$(d_0, d_1, \ldots, d_N) = (0, c_0, c_1, \ldots, c_{N-1})*M/L,$$

where the normalization constant L is chosen such that for all the codewords, all the coordinates are between −1 and 1. The MIC's $\lambda = (\lambda_0, \lambda_1, \ldots, \lambda_{N-1})$ are transformed to new MIC's $\mu = (\mu_0, \mu_1, \ldots, \mu_N)$ via $$(\mu_0, \mu_1, \ldots, \mu_N) = (0, \lambda_0, \lambda_1, \ldots, \lambda_{N-1})*M.$$

As can easily be verified by anyone with rudimentary skill in the art, the new codewords are balanced, and the new MIC's are common-mode-resistant. Moreover, since M is orthogonal, the new code has the same ISI-ratio as the old one.

As can be appreciated by readers of skill in the art, the transformation above is valid for any code with central MIC's, not just PM-II codes.

EXAMPLE 3

3-Dimensional Balanced Code and its Quantization

We use the PM-II code generated by $(1, \sqrt{2}-1)$, and use the following orthogonal matrix $$M = \begin{pmatrix} 1/\sqrt{3} & 1/\sqrt{3} & 1/\sqrt{3} \\ 1/\sqrt{2} & -1/\sqrt{2} & 0 \\ 1/\sqrt{6} & 1/\sqrt{6} & -2/\sqrt{6} \end{pmatrix}.$$

After scaling, the MIC's become:
  $(1,-1,0)$, $(1,1,-2)$, $(1+\sqrt{3},1-\sqrt{3},-2)$, $(-1+\sqrt{3},-1-\sqrt{3},2)$.
The following is a list of the 8 codewords:
  $(-a,1,-b)$, $(-1,a,b)$, $(1,-a,-b)$, $(a,-1,b)$,
  $(c,d,-e),(-d,-c,e)$, $(d,c,-e)$, $(-c,-d,e)$,
where $a=(\sqrt{3}-\sqrt{2}+1)/t$, $b=2(\sqrt{2}-1)/t$, $c=(\sqrt{6}-\sqrt{3}-1)/t$, $d=(\sqrt{6}-\sqrt{3}+1)/t$, $e=2/t$, and $t=\sqrt{3}+\sqrt{2}-1$.
This code has pin-efficiency 1, and an ISI-ratio of $\sqrt{2}+1$.

In practice it may not be realistic to reproduce the exact values of the codewords on the wires. Quantization can be applied to both the codewords and the MIC's to obtain a simpler vector signaling code with similar properties as the one described here. Many different forms of quantization are possible. For example, if the coordinates of the codewords and the coordinates of the MIC's are to be from 10 different values, the code can be chosen to consist of the codewords
  $\pm(0.6,-1,0.4)$, $\pm(-0.2,-0.8,1)$, $\pm(-0.8,-0.2,1)$, $\pm(1,-0.6,-0.4)$,
and the MIC's are
  $(1,-1,0)$, $(0.33,-1,0.67)$, $(-1,0.33,0.67)$, $(0.5,0.5,-1)$.
The ISI ratios of these MIC's are 2.67, 2.44, 2.44, and 2.5, respectively.

EXAMPLE 4

4-Dimensional Balanced Code and its Quantization

Here we will use the PM-II code generated by $x_0=(1, \sqrt{2}-1, \sqrt{2}-1)$ of Example 2 together with the Hadamard transform matrix $$M = \frac{1}{2}\begin{pmatrix} 1 & 1 & 1 & 1 \\ 1 & -1 & 1 & -1 \\ 1 & 1 & -1 & -1 \\ 1 & -1 & -1 & 1 \end{pmatrix}.$$

There are 9 comparators given in the following:

$\frac{1}{2}(1,-1,1,-1)$, $\frac{1}{2}(1,1,-1,-1)$, $\frac{1}{2}(1,-1,-1,1)$, $(1,-1,0,0)$, $(1,0,-1,0)$, $(1,0,0,-1)$, $(0,1,-1,0)$, $(0,1,0,-1)$, $(0,0,1,-1)$.

The 24 codewords, properly normalized to have coordinates between −1 and 1, are given in the following (a, −c, −c, b), (c, −b, −a, c), (c, −a, −b, c), (b, −c, −c, a), (−b, c, c, −a), (−c, a,b,−c), (−c, b, a, −c), (−a, c, c, −b), (a, b, −c, −c), (c, c, −a, −b), (−b, −a, c, c), (−c, −c, b, a), (c, c, −b, −a), (b, a, −c, −c), (−c, −c, a, b), (−a, −b, c, c), (a, −c, b, −c), (−b, c, −a, c), (c, −a, c, −b), (−c, b, −c, a), (c, −b, c, −a), (−c, a, −c, b), (b, −c, a, −c), (−a, c, −b, c)

where a=1, b=$(-5+4\sqrt{2})/7$~0.094, and c=$(1+2\sqrt{2})/7$~0.547.

This code has an alphabet of size 6, has 24 codewords, and an ISI-ratio of $\sqrt{2}+1$. It is therefore better than the quaternary PM-code generated by the vector(1, 1/3, −1/3, −1) which also has 24 codewords, but a worse ISI-ratio of 3.

Figure 9:
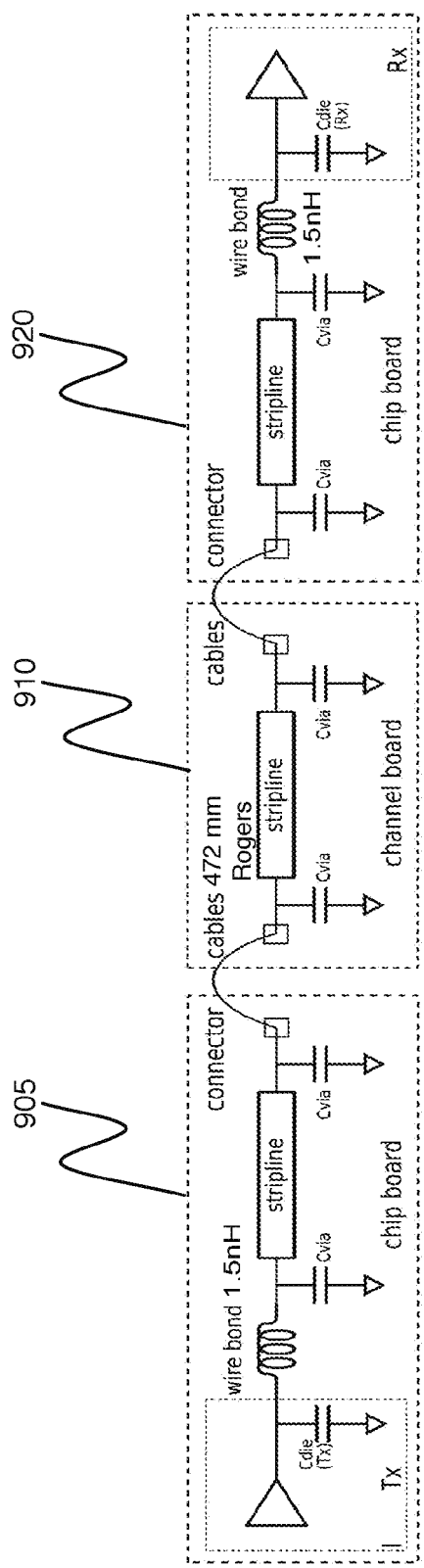
FIG. 9 shows the communications channel simulated to produce the results of Table I.

Table I below has been compiled using statistical eye diagram software developed by the company Kandou Bus. The channel setup is given in FIG. 9. It comprises a chip board 905 consisting of a chip wire-bonded to a short stretch of stripline on the chip board. The striplines are connected via cables to a channel board 910 containing 472 mm of stripline on a Rogers material. These striplines are connected again via cables to another chip board 920 consisting of connectors and a stripline and eventually connected with another chip which is wire-bonded with the chip board. The channel has been extracted from a real model using a vector network analyzer. The following table shows the horizontal opening of the worst eye for various UI rates per wire. The third column is the horizontal opening for the PM-II code described here, and the last column shows the horizontal opening for the PM code generated by the vector (1, 1/3, −1/3, −1). The numbers are in pico-seconds. As can be seen, the lower ISI-ratio of the PM-II code results in a larger horizontal opening.

TABLE I

| UI rate per wire in GHz | PM-II | PM |
|---|---|---|
| 1 | 660 | 600 |
| 2 | 320 | 285 |
| 3 | 206 | 183 |
| 4 | 145 | 127 |
| 5 | 110 | 94 |
| 6 | 88 | 73 |
| 7 | 68 | 57 |
| 8 | 56 | 42 |
| 9 | 46 | 35 |
| 10 | 38 | 28 |
| 11 | 32 | 24 |
| 12 | 26 | 18 |
| 13 | 24 | 17 |
| 14 | 17 | 11 |
| 15 | 16 | 10 |

In practice, it may be difficult to create the exact values for b and c on the wires. The ISI-ratio is somewhat robust to slight variations of these choices. For example, choosing b=0.1 and c=0.55, the ISI-ratios of the first 3 comparators become 22/9~2.44 and the ISI-ratios of the other 6 comparators become 31/13~2.39. Simulation of this code does not reveal any noticeable difference in terms of the horizontal and vertical opening compared to the original code. Other quantizations are also possible, as is evident to someone of moderate skill in the art.

EXAMPLE 5

Reduced Number of Comparators

Teachings of Shokrollahi I can be used to reduce the number of comparators of the vector signaling code in Example 4 by reducing the set of codewords accordingly. The following examples are compiled using those methods.

EXAMPLE 5.1

8 Codewords and 3 Comparators

The following 8 codewords
(−1, c, −b, c), (1, −c, b, −c), (c, c, −b, −1), (−c, −c, b, 1),
(−c, b, 1, −c), (c, −1, −b, c), (c, −b, −1, c), (−c, 1, b, −c)
and the following three comparators
(1,0, −1,0), (0,1, −1,0), (0,0, −1,0)
define a vector signaling code with ISI ratio $\sqrt{2}+1$. The number of comparators is obviously optimal.

EXAMPLE 5.2

12 Codewords and 4 Comparators

The following 12 codewords
(−1, c, −b, c), (b, −c, 1, −c), (−c, 1, −c, b), (c, −b, c, −1),
(−c, b, −c, 1), (−b, c, −1, c), (1, −c, b, −c), (−c, b, 1, −c),
(−b, c, c, −1), (c, −1, −b, c), (c, −b, −1, c), (c, −1, c, −b)
and the following four comparators
(1,1,−1,−1)/2, (1,−1,−1,1)/2, (1,−1,0,0), (0,0,−1,1)
define a vector signaling code of ISI ratio $\sqrt{2}+1$.

EXAMPLE 5.3

16 Codewords and 5 Comparators

The following 16 codewords
(c, c, −b, −1), (−1, −b, c, c), (−c, −c, 1, b), (b, 1, −c, −c),
(1, −c, −c, b), (−c, −c, b, 1), (−b, −1, c, c), (c, c, −1, −b), (−1, c, c, −b), (−c, b, 1, −c), (−c, 1, b, −c), (−b, c, c, −1), (b, −c, −c, 1), (c, −1, −b, c), (c, −b, −1, c), (1, b, −c, −c), and the following five comparators (1,−1,1,−1)/2, (1,1,−1,−1)/2, (1,−1,−1,1)/2, (1,0,−1,0), (0,1,0,−1)

define a vector signaling code of ISI ratio $\sqrt{2}+1$.

Applications to the Design of Dense Dynamic Random Access Memory (DRAM)

Permutation modulation codes of type 2 can also be used for more efficient storage of bits in dynamic random access memory (DRAM) chips. Efficient storage of data in DRAM's has been the subject of much investigation. In particular, Cronie IV describes methods for DRAM storage that lead to higher density and increased noise resilience. The methods of Cronie IV are for the most part based on permutation modulation codes. The use of permutation modulation codes of type 2 will allow for higher storage density in a group of DRAM cells of a given size, as will be explained below.

Figure 10:
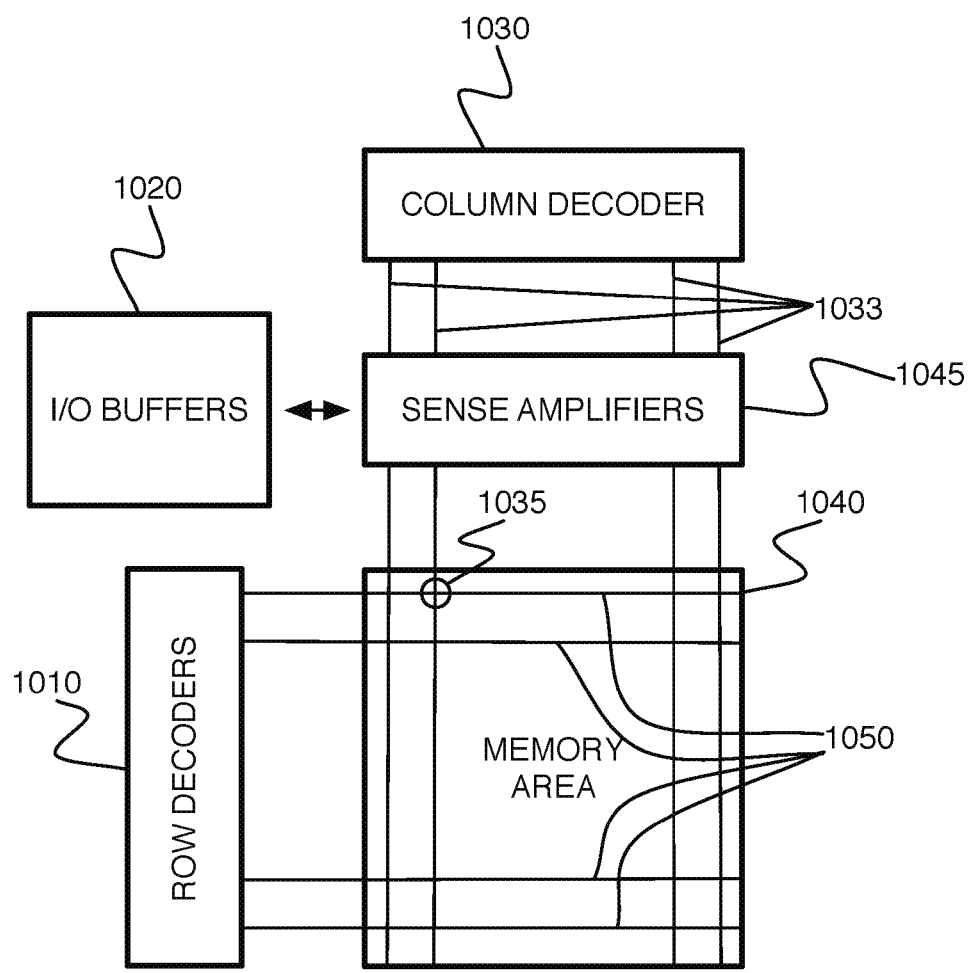
FIG. 10 illustrates a prior art embodiment of a Dynamic Random Access Memory device.

FIG. 10 is an exemplary block diagram schematic of a conventional DRAM storage device. Briefly, a conventional DRAM storage device comprises a column decoder 1030, I/O buffers 1020, sense amplifiers 1045, row decoders 1010, and a memory area 1050. The memory area contains the actual memory cells 1035. These memory cells 1035 are connected via bitlines 1033, to the sense amplifiers 1045 and the column decoder 1030, and, via wordlines 1050, to associated memory cells 1035 and to row decoders 1010. In operation, to write to a memory cell, the row and the column address of the cell is selected by the column and row decoders 1030 and 1010. Here, the data to be stored is received by the I/O buffers 1020 and stored into a selected memory cell via the sense amplifiers 1045. The chip's on-board logic charges the cell capacitance or discharges it, using the bitlines and the wordlines.

Figure 11:
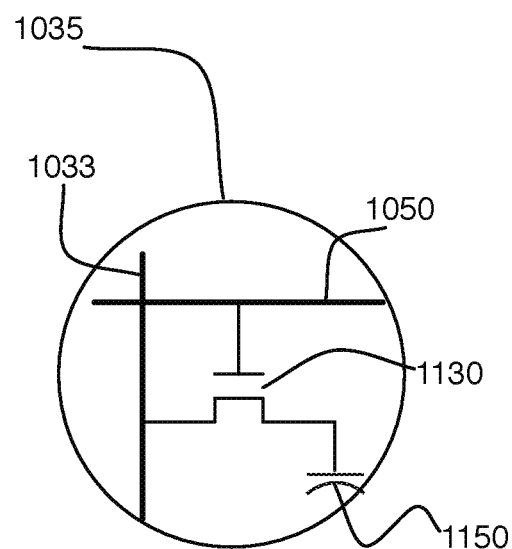
FIG. 11 illustrates a prior art embodiment of one DRAM storage cell as used in the device of FIG. 10.
Figure 12:
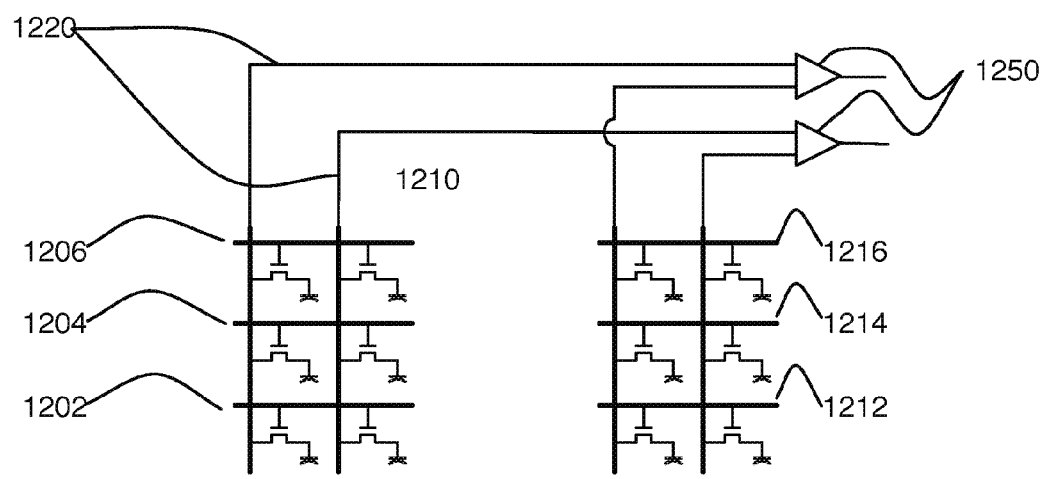
FIG. 12 is a schematic illustration of prior art connection of sense amplifiers in a DRAM device such as shown in FIG. 10.

The structure of a conventional DRAM memory cell 1035 is further highlighted in FIG. 11. It consists of a transistor 1130 and a capacitor 1150. The capacitor stores a charge that corresponds directly to the data state of the data input to the I/O buffers 1020. When wordline 1050 is activated, during a write operation, the charge is transferred to the bitline 1033. The charge stored in memory cell 1035 is used to determine the "value" stored therein. In this regard, with reference to FIG. 12, bitlines 1220 are pre-charged to $V_{dd}/2$. The bitlines on the group of bits on the right hand side of the figure will be read by opening the wordlines 1212, 1214, and 1216, and the difference of the charge to the pre-charged values of bitlines 1220 are measured by the sense amplifiers 1250. These readings are then forwarded to the row decoders for obtaining the bit values in each cell. Thus, in conventional DRAM memory, each memory cell 1035 stores a charge in and outputs a charge from the associated capacitor 1150 which corresponds directly to the value of the data received by and output from the I/O buffers 1020.

A different DRAM structure is now disclosed using the example of the code PM2-2 of Example 1 above. The particular quantization chosen in this code is not important for the working of this disclosure and other quantizations that lead to the same number of codewords and comparators work in the same way.

Figure 13:
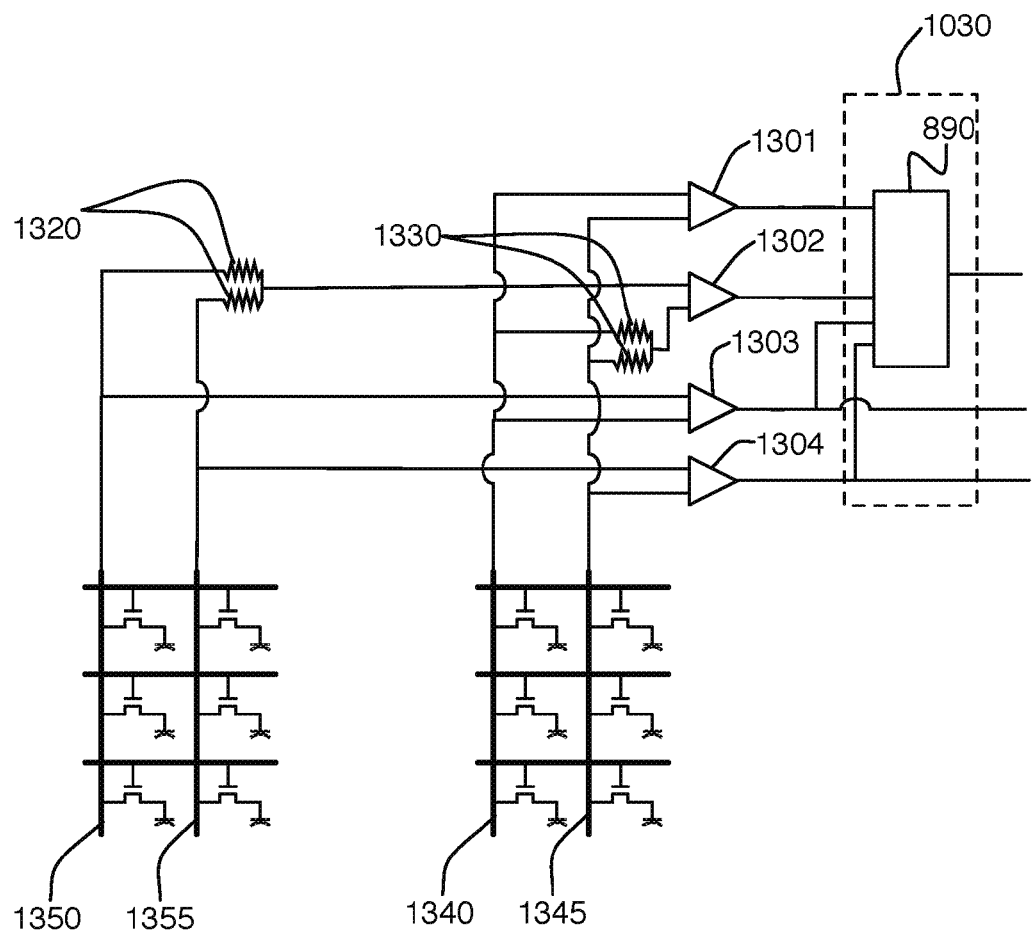
FIG. 13 is a schematic illustrating one embodiment of the invention in a DRAM device.

This embodiment, shown in FIG. 13, incorporates a memory area 1040 as in FIG. 10. However, the DRAM cells in this embodiment's memory area are grouped into sets of 2 adjacent cells each, which are written and read together. For each such group, there are 4 (instead of 2) sense amplifiers 1301, 1302, 1303, and 1304. Sense amplifiers 1303 and 1304 are as before. Sense amplifier 1302 in effect measures the average of the values on bitlines 1340 and 1345 using the resistors 1330 of equal resistance, against the average of the values on bitlines 1350 and 1355, precharged to $V_{dd}/2$, as described above. This average is computed using a similar pair 1320 of resistors on these bitlines. Sense amplifier 1301 measures the values of the bitlines 1340 and 1345 against one another. In an alternative embodiment, the multi-input comparators of Holden I may be used to calculate the average values and perform their comparison functions without the introduction of additional resistors into the sense amplifier input path.

The values of these sense amplifiers are forwarded to the column decoder unit 1030. This unit may include the decoding logic 890 of FIG. 8 or any other logic that can uniquely recover the 3 bits from the four sense amplifier measurements.

The number of DRAM cells in a group and the number of sense amplifiers are given for descriptive purposes, and do not imply a limitation. It will be apparent to one familiar with the art that the described method be applied to groups of DRAM cells greater than two, and sets of sense amplifiers greater than four to support different numbers of bits being stored per DRAM cell group.

I claim:

1. An apparatus comprising:
a plurality of groups of adjacent memory cells, each group of adjacent memory cells holding elements of a balanced, reference-less vector signaling codeword as charge levels;
a set of sense amplifiers connected to the plurality of groups of adjacent memory cells, each sense amplifier configured to receive at least two elements of the balanced, reference-less vector signaling codeword, the respective set of sense amplifiers configured to generate a plurality of sense amplifier values; and
a logic decoder configured to receive the plurality of sense amplifier values from the respective set of sense amplifiers and to responsively generate a set of output bits.

2. The apparatus of claim 1, wherein the balanced, reference-less vector signaling codeword comprises N elements and wherein the set of sense amplifiers comprises N comparators, wherein N is an integer greater than 1.

3. The apparatus of claim 1, wherein the set of sense amplifiers comprises at least
one sense amplifier configured to generate a sense amplifier value of the plurality of sense amplifier values by comparing an average of a first two elements of the balanced, reference-less vector signaling codeword to an average of a second two elements of the balanced, reference-less vector signaling codeword.

4. The apparatus of claim 3, further comprising parallel resistor networks configured to generate the averages of the first and second two elements of the balanced, reference-less vector signaling codeword.

5. The apparatus of claim 1, wherein the plurality of sense amplifiers comprises one or more multi-input comparators.

6. The apparatus of claim 5, wherein at least one of the multi-input comparators has two or more input weighting coefficients.

7. The apparatus of claim 5, wherein the one or more multi-input comparators have input weighting coefficients selected according to an orthogonal matrix.

8. The apparatus of claim 7, wherein the orthogonal matrix is a Hadamard matrix.

9. The apparatus of claim 1, further comprising:
an encoder configured to receive a set of information bits, and to responsively generate elements of a second balanced, reference-less vector signaling codeword; and
a memory write circuit configured to store the elements of the second balanced, reference-less vector signaling codeword in a selected group of adjacent memory cells.

10. The apparatus of claim 1, wherein the balanced, reference-less vector signaling codeword is a permutation modulation codeword.

11. A method comprising:
obtaining elements of a balanced, reference-less vector signaling codeword from a selected group of adjacent memory cells of a plurality of groups of adjacent memory cells, the selected group of adjacent memory cells holding the elements of the balanced, reference-less vector signaling codeword as charge levels;
generating, for the selected group of adjacent memory cells, a plurality of sense amplifier values using a set of sense amplifiers, each sense amplifier configured to receive at least two elements of the balanced, reference-less vector signaling codeword; and
generating a set of output bits by decoding the plurality of sense amplifier values.

12. The method of claim 11, wherein the balanced, reference-less vector signaling codeword comprises N elements, and wherein the set of sense amplifiers comprises N comparators, wherein N is an integer greater than 1.

13. The method of claim 11, wherein
generating at least one sense amplifier value of the plurality of sense amplifier values comprises comparing an average of a first two elements of the balanced, reference-less vector signaling codeword to an average of a second two elements of the balanced, reference-less vector signaling codeword.

14. The method of claim 13, wherein the averages of the first and second two elements of the balanced, reference-less vector signaling codeword are generated using parallel resistor networks.

15. The method of claim 11, wherein the plurality of sense amplifiers comprises one or more multi-input comparators.

16. The method of claim 15, wherein at least one of the multi-input comparators has two or more input weighting coefficients.

17. The method of claim 15, wherein the one or more multi-input comparators have input weighting coefficients selected according to an orthogonal matrix.

18. The method of claim 17, wherein the orthogonal matrix is a Hadamard matrix.

19. The method of claim 11, further comprising:
receiving a set of information bits;
generating elements of a second balanced, reference-less vector signaling codeword; and
storing the elements of the second balanced, reference-less vector signaling codeword in a selected group of adjacent memory cells.

20. The method of claim 11, wherein the balanced, reference-less vector signaling codeword is a permutation modulation codeword.

* * * * *